Dec. 27, 1966  J. A. CANADAY ETAL  3,295,128
TRAJECTORY MEASUREMENT APPARATUS
Filed April 23, 1965  12 Sheets-Sheet 1

INVENTORS
JAMES A. CANADAY
JAMES B. GASTON
BY JEROME C. HILL

ATTORNEY

Dec. 27, 1966  J. A. CANADAY ETAL  3,295,128
TRAJECTORY MEASUREMENT APPARATUS
Filed April 23, 1965  12 Sheets-Sheet 2

INVENTORS
JAMES A. CANADAY
JAMES B. GASTON
BY JEROME C. HILL

ATTORNEY

INVENTORS
JAMES A. CANADAY
JAMES B. GASTON
JEROME C. HILL
ATTORNEY

Dec. 27, 1966  J. A. CANADAY ETAL  3,295,128
TRAJECTORY MEASUREMENT APPARATUS

Filed April 23, 1965  12 Sheets-Sheet 4

INVENTORS
JAMES A. CANADAY
JAMES B. GASTON
BY JEROME C. HILL

ATTORNEY

Dec. 27, 1966 J. A. CANADAY ET AL 3,295,128
TRAJECTORY MEASUREMENT APPARATUS
Filed April 23, 1965 12 Sheets-Sheet 5

INVENTORS
JAMES A. CANADAY
JAMES B. GASTON
BY JEROME C. HILL

ATTORNEY

INVENTORS
JAMES A. CANADAY
JAMES B. GASTON
BY JEROME C. HILL

ATTORNEY

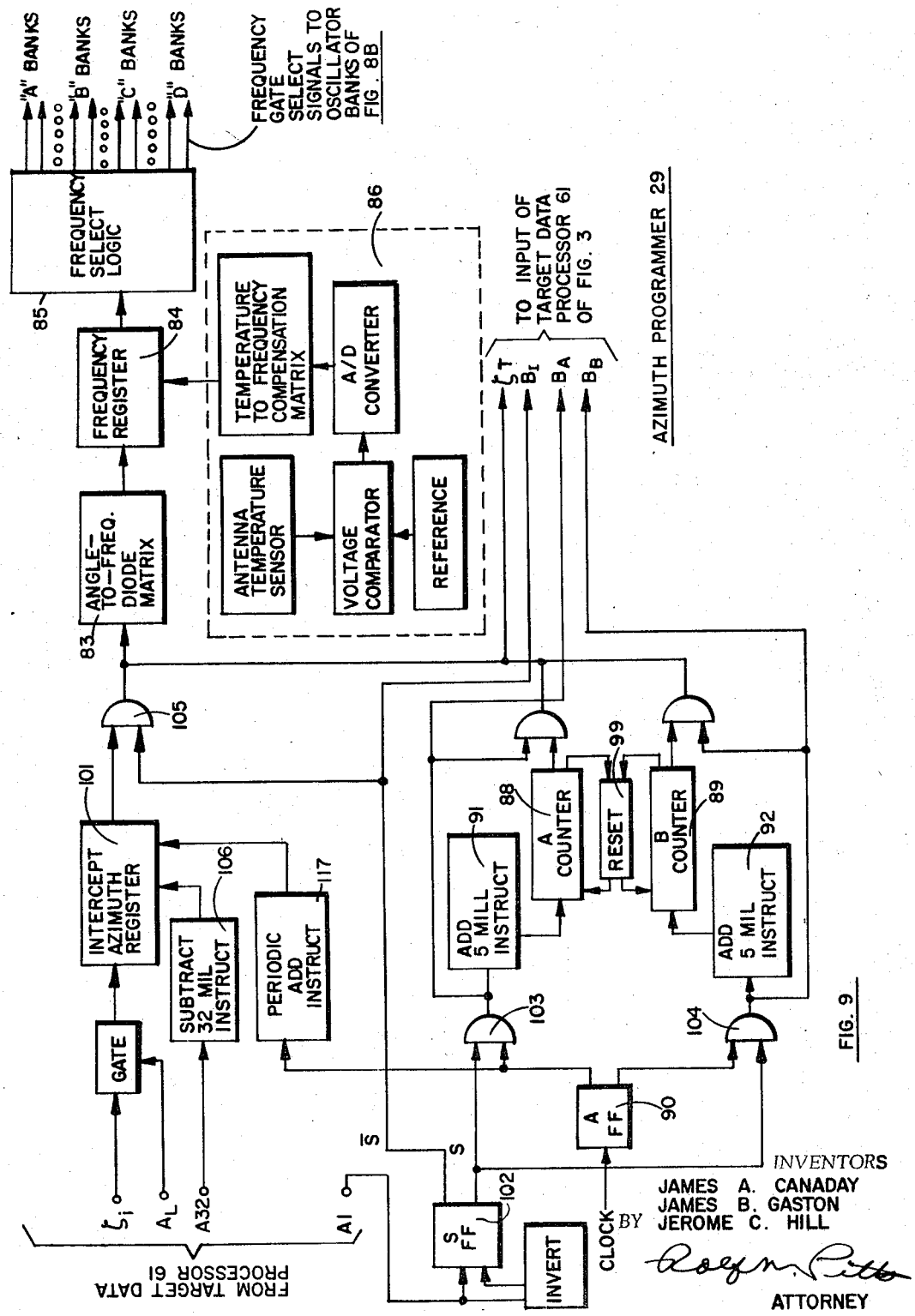

INVENTORS
JAMES A. CANADAY
JAMES B. GASTON
JEROME C. HILL
BY
ATTORNEY

Dec. 27, 1966  J. A. CANADAY ETAL  3,295,128
TRAJECTORY MEASUREMENT APPARATUS
Filed April 23, 1965  12 Sheets-Sheet 12

FIG. 14

INVENTORS
JAMES A. CANADAY
JAMES B. GASTON
BY JEROME C. HILL

ATTORNEY

3,295,128
TRAJECTORY MEASUREMENT APPARATUS
James A. Canaday, Fullerton, James B. Gaston, La Mirada, and Jerome C. Hill, Fullerton, Calif., assignors to North American Aviation, Inc.
Filed Apr. 23, 1965, Ser. No. 450,380
18 Claims. (Cl. 343—7)

The subject invention relates to a radar system and more particularly to a useful system for measuring two trajectory points on the trajectory of a moving body.

In the conduct of limited warfare, and in areas of rough terrain, the mortar is a significant frontline infantry support weapon, firing a projectile having a high, ballistic trajectory, which throws or lobs the projectile into the target area. Such high ballistic trajectory is employed to achieve a maximum range with the lower muzzle velocities provided by such light weight weapon. The mortar is a simple weapon which is easily mass-produced, is easily operated, requires little maintenance, and is extremely mobile. Also, the mortar can be set up to operatively fire its projectiles in very short time, and can maintain a high rate-of-fire in terms of rounds of ammunition per minute. For these reasons, the mortar continues to be used in conventional war situations. Because of the large percentage of the total casualties inflicted in a conventional battlefield situation by such weapon, a counter weapon system is required to counter or oppose it.

A counter-mortar weapon system is one which determines the location of the mortar weapon. Because the mortar may be fired from a concealed location, one means of determining the mortar location is to detect the mortar projectile by radar, measuring its position at several points along its trajectory, and then compute the mortar location from such data. While radar systems exist which can detect a projectile and locate its position along the projectile's trajectory, such radars have been too large and heavy to provide the mobility and deployment characteristics desired for such systems, so as to be effective against "hit-and-run" type weapon tactics. Such reduced mobility and restricted deployment also prevent taking advantage of preferred terrain locations providing reduced radar ground clutter return. Also, such prior art systems have not provided the desired degree of precision, and are not simple to operate. For example, the radar operator is required to perform many functions in the system operation, whereby the accuracy of the system is subject to the training, skill and performance of the operator.

In one such prior art system, a tracking radar (weighing three tons) tracks a projectile of interest and converts the slant range and elevation angle to horizontal range and vertical height data, the time history of the tracked range, altitude and azimuth being plotted or recorded on a recording device. The plotted time history is then extrapolated by hand; the operator extrapolates the altitude curve to zero or a datum altitude, the extrapolated time occurrence of such reference altitude being deemed the time of origin or firing point of the tracked trajectory. The corresponding extrapolated values of the similarly extrapolated azimuth and range curves for such time of origin are deemed to indicate the sought-for location of the hostile mortar weapon.

The disadvantages of such a radar are several: the heavy weight of such tracking radar system seriously restricts the mobility and speed of deployment of the device. Also, the reliance upon the diligence and skill of a human operator to (1) switch the tracking radar into a tracking mode upon initial detection of a shell, and (2) manually extrapolate a set of time histories to attempt to determine the location of a hostile weapon, seriously limits the performance and accuracy of the system. Further, the reliance on manual extrapolation of analog data seriously limits the data rate developed by such technique, as to limit the rate at which different trajectories may be sequentially tracked. Moreover, the reliance on a tracking system, which tracks only one projectile at a time, precludes the ability to develop the data for several concomitant trajectories (representing the presence of several weapons) concurrently.

In another prior art system, an electro-mechanically scanning (non-tracking) radar system, weighing about 6100 pounds, provides an elaborate B-scope display of a detected target. The radar operator marks the face of the display tube with a grease pencil or the like to mark two selected target positions representing a trajectory of interest. By means of handwheels coupled to pickoffs, the operator positions azimuth and range strobes over the two selected echo displays, the pickoffs providing signals indicative of the corresponding slant range and azimuth of the selected target indications. A computer, responsive to the azimuth and slant range signals and to the elevation angle of the radar antenna, then provides a straight line extrapolated of the two selected target (shell) positions to estimate the hostile weapon location.

In addition to the weight disadvantage of such prior art system, the straight-line extrapolation technique employed by such system provides a limited theoretical accuracy. Also, such technique limits the system to considering only the initial (upwardly moving) portion of the trajectory, and not the mid or terminal portions of the trajectory. Further, such theoretical accuracy is lessened in practice by the reliance upon the skill and diligence of the human operator in selecting the target indications of interest and in laying the strobes upon such selected ones of the displayed targets. Moreover, such technique of manual target selection and manual insertion of computer input data limits the rate at which successive trajectories may be sequentially extrapolated.

By means of the concept of the subject invention, a highly effective automatic counter-mortar radar system is provided which is highly precise, simpler to operate and highly mobile, as to be adaptable to operating in any terrain where a mortar weapon may be deployed, and which is adapted to handling a plurality of targets concomitantly.

In a preferred embodiment of the invention, there is provided an azimuthally-directional, frequency-scanned antenna comprising an upper, lower and center feed for providing a stacked beam pattern comprising an upper, lower and center beam. The axis of symmetry of the combination of the lower and center beams defines a first monopulse boresight axis, and the axis of symmetry of the combination of the center and upper beams defines a second monopulse boresight axis. A variable-frequency pulsed transmitter cooperates with the antenna for transmitting pulsed energy having a carrier frequency which is progressively changed from pulse-to-pulse. There is also provided monopulse sum and difference receiving means responsive to the center feed and an alternative one of the upper and lower feeds for providing a signal indicative of the range and on-boresight condition respectively of a detected target relative to an alternative one of the boresight axes.

In normal operation of the above described arrangement, the progressive change in the discrete carrier frequency produces a corresponding change in the azimuthal direction of the directivity of the directional, frequency-scanned antenna (e.g., the azimuth direction of the two boresight axes). The indication of a finite sum signal and an associated null difference signal in the monopulse receiver indicates the presence of the detected target on a selected one of the boresight axes, corresponding to a selected elevation angle, the time phase or delay of the sum signal relative to the transmitted pulse being indicative of the radial distance of the projectile, and the frequency of the transmitted pulse indicative of the azimuth direction thereof. The subsequent indication of a finite sum and null difference signal for the other of the two boresight axes, together with the associated programmed transmitter frequency and elevation angle of such other boresight axis, similarly indicates the range and direction of a second point on the trajectory of the detected projectile. The time-separation between such second observed trajectory point and the first observed point comprises additional trajectory data. Therefore, the above described arrangement provides radar means for measuring the time-space occurrence of two mutually spaced points on a ballistic trajectory relative to a reference datum. Such time-space data may then be processed to additionally determine an average velocity and direction of the projectile during the interval of such two points in time. Further automatic processing of the radar data may then be undertaken to determine the point of origin of the ballistic trajectory (i.e., the location of the mortar).

Because of the combination of the frequency scanning of the azimuthal direction of the antenna and the on-boresight data processing by elevation-plane monopulse receiver, the direction of the projectile can be determined without the use of heavy actuator means for torquing the inertia of a physical antenna array, and without the need of angular position transducers and associated additional means for providing direction-indicating signals. Also, the higher speeds at which the inertia-less frequency scanning may be accomplished provides the ability to measure two points lying on a common trajectory and separated in time-space. Further, the use of three vertically-stacked beams to define two vertically arrayed monopulse boresight axes for measuring when the projectile successively crosses each of the azimuthally-scanned boresight axes provides efficient means for accurately determining the elevation angle of each of the two points. Moreover, the combination of the three vertical stacked beams to provide a vertical array of two monopulse boresight axis which are commonly scanned in azimuth provides time-space position data of two points of a trajectory by efficient means employing a minimum of radar equipment which may be packaged within a smaller volume and having lesser weight than systems heretofore employed. Additionally, the nature of the data provided may be automatically processed for determination of the origin of the trajectory. Such automatic data processing in combination with the frequency scanned stacked beam monopulse radar may process the data for several trajectories concurrently. Further, such automatic data processing may employ data representing any portion of a trajectory of interest, rather than solely the initial portion; and enables location of an enemy mortar site before the first enemy mortar shell hits its target. Additionally, such system can be operated unattended and relay its output data to a remote data utilization point by means of a digital data link, if desired. Accordingly, it is an object of the invention to provide improved apparatus useful in the measurement of a trajectory.

It is another object of the subject invention to provide high-precision means for measuring the time-space occurrence of two mutually spaced points of a trajectory.

It is still another object of the subject invention to provide monopulse means having a vertical array of two azimuthally frequency-scanned boresight axes for acurately determining the time-space occurrence of two points on a trajectory.

It is yet another object to provide a light weight, compact radar system that is highly mobile.

It is a further object of the invention to provide a mobile system that is highly effective as a counter-mortar weapon.

These and other objects will become apparent from the following description, taken together with the accompanying drawings in which:

FIG. 9 is a block diagram of the programmer of FIG. 3.

FIG. 14 is a simplified block diagram of the target data processor.

In the figures, like reference characters refer to like parts.

Figure 1:
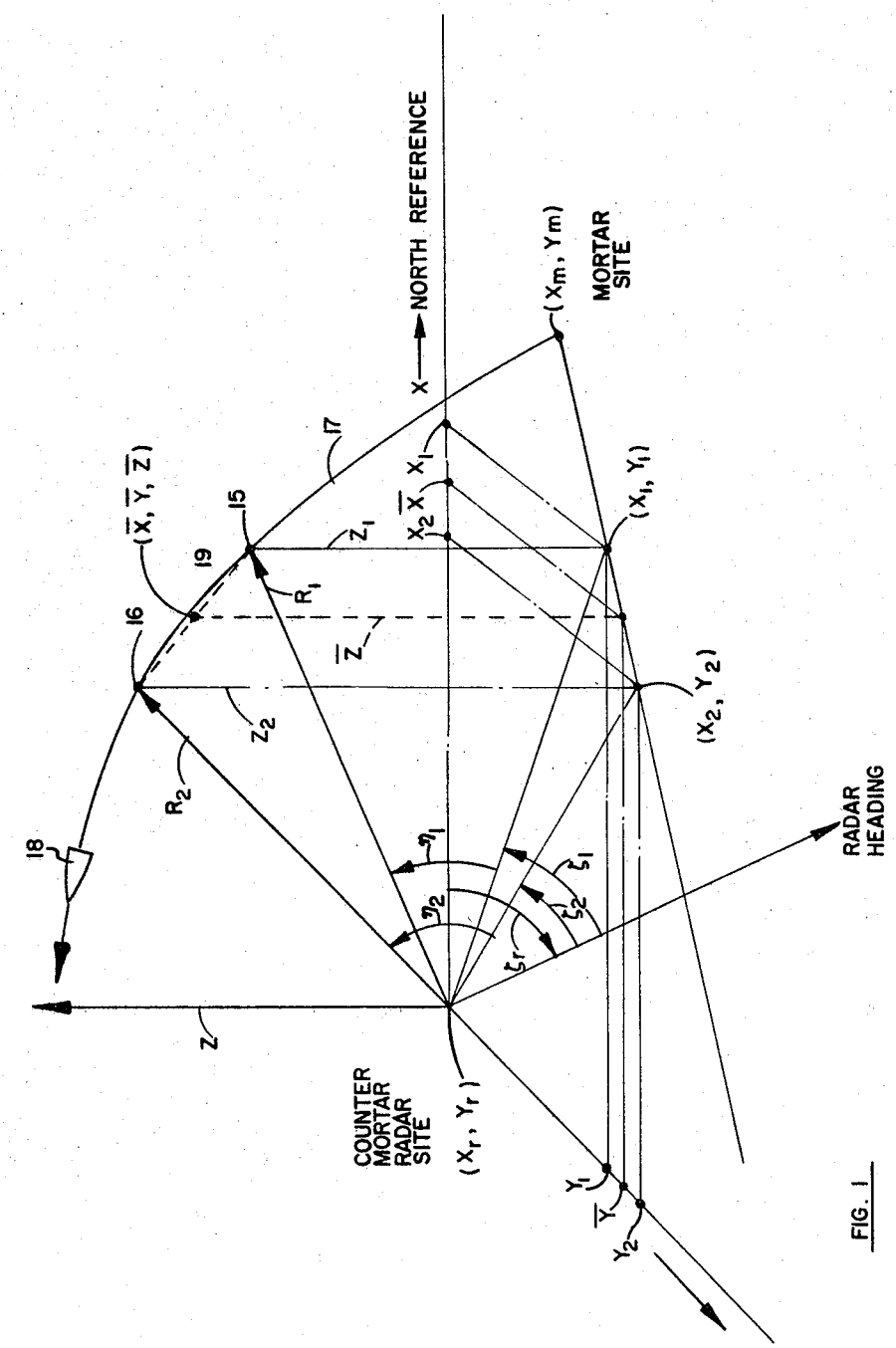
FIG. 1 is a diagram of a ballistic trajectory, illustrating the geometry of the counter mortar weapon problem.

Referring now to FIG. 1, there is illustrated a diagram of a ballistic trajectory having a point of origin in a horizontal datum plane, and showing the geometry of the counter mortar weapon problem. The point of origin of the ballistic trajectory may represent the location of a mortar. The origin of the coordinates system, in which the two points 15 and 16 of the trajectory 17 are to be measured, corresponds to the location of the counter mortar radar.

The cartesian coordinates $(X_1, Y_1$ and $Z_1)$ of a first point 15 on trajectory 17 may be resolved from the indicated polar coordinates as follows:

$$X_1 = R_1 \cos \eta_1 \cos (\zeta_1 + \zeta_R) \quad (1)$$
$$Y_1 = R_1 \cos \eta_1 \sin (\zeta_1 + \zeta_R) \quad (2)$$
$$Z_1 = R_1 \sin \eta_1 \quad (3)$$

Similarly, the cartesian coordinates $(X_2, Y_2$ and $Z_2)$ of a second point 16 on trajectory 17 may also be resolved from the associated polar coordinates thereof as follows:

$$X_2 = R_2 \cos \eta_2 \cos (\zeta_2 + \zeta_R) \quad (4)$$
$$Y_2 = R_2 \cos \eta_2 \sin (\zeta_2 + \zeta_R) \quad (5)$$
$$Z_2 = R_2 \sin \eta_2 \quad (6)$$

A velocity is computed for the projectile 18 intermediate the two trajectory points, employing the time interval, $\Delta T$, between such points. The velocity so determined will be applicable only to a point 19 midway between the two points 15 and 16. Accordingly, the coordinates $\bar{X}$, $\bar{Y}$ and $\bar{Z}$ of such intermediate point are determined as:

$$\bar{X} = \frac{X_1 + X_2}{2} \quad (7)$$

$$\bar{Y} = \frac{Y_1 + Y_2}{2} \quad (8)$$

$$\bar{Z} = \frac{Z_1 + Z_2}{2} \quad (9)$$

The resolved components of such velocity V are determined as follows:

$$V_x = \frac{X_2 - X_1}{\Delta T} \quad (10)$$

$$V_y = \frac{Y_2 - Y_1}{\Delta T} \quad (11)$$

$$V_z = \frac{Z_2 - Z_1}{\Delta T} \quad (12)$$

The remaining information necessary to determine the mortar location ($X_m$, $Y_m$), is the time T required for the projectile to get from the mortar location to the intermediate point ($\bar{X}$, $\bar{Y}$, $\bar{Z}$). Such time of flight can be determined from the ballistic equations for a projectile in a vacuum (e.g., aerodynamic drag and associated effects are ignored), employing only those equations which related to the vertical component of motion of the projectile:

$$V_z = V_{zo} - gT \quad (13)$$

$$\bar{Z} = V_{zo}T - \tfrac{1}{2}gT^2 \quad (14)$$

where:

$g$ = gravitational acceleration constant, and
$V_{zo}$ = vertical component of initial velocity of the projectile.

The initial velocity term $V_{zo}$ is generally unknown to the observer. However, Equations 13 and 14 can be solved simultaneously to eliminate the term $V_{zo}$, thus permitting the determination of the time T in terms of $g$, $V_z$ and $\bar{Z}$, as follows.

Rearranging Equation 13:

$$V_{zo} = V_z + gT \quad (15)$$

Rearranging Equation 14:

$$V_{zo} = \frac{\bar{Z}}{T} + g\frac{T}{2} \quad (16)$$

Subtractively combining Equations 15 and 16:

$$0 = V_z + g\frac{T}{2} - \frac{\bar{Z}}{T} \quad (17)$$

Rearranging Equation 17:

$$0 = T^2 \frac{2V_z T}{g} - \frac{2\bar{Z}}{g} \quad (18)$$

Solving for T:

$$T = \left[\left(\frac{V_z}{g}\right)^2 + \frac{2\bar{Z}}{g}\right]^{1/2} - \frac{V_z}{g} \quad (19)$$

Because the horizontal components of the projectile velocity are substantially unchanged over the trajectory period, the horizontal components of the projectile motion subsequent to firing can be determined from the time of flight (T) and the horizontal components of velocity ($V_x$ and $V_y$). Hence, the mortar location ($X_m$, $Y_m$) may be determined, employing the solution of Equation 19 for T and the solution of Equations 10 and 11 for $V_x$ and $V_y$ as follows:

$$X_m = \bar{X} + TV_x + X_r \quad (20)$$

$$Y_m = \bar{Y} + TV_y + Y_r \quad (21)$$

where $X_r$ = northing coordinates of the radar location on an elevation reference map
$Y_r$ = easting coordinates of the radar location on an elevation reference map Such determination of the point of origin (in a horizontal datum plane) of a ballistic trajectory is seen not to rely upon the observation of only the initial portion of the trajectory, but may alternatively be made from observation of two points on other portions of the trajectory, such as the mid or terminal portions thereof. If the elevation of the mortar location appears, from reference to an elevation map of the area, to be different from that of the radar location, such elevation difference $\Delta Z$ may be combined with, or used to bias, the term $\bar{Z}$ in order to compensate the term T solved for by means of Equation 19, and employed in Equations 20 and 21.

Figure 2:
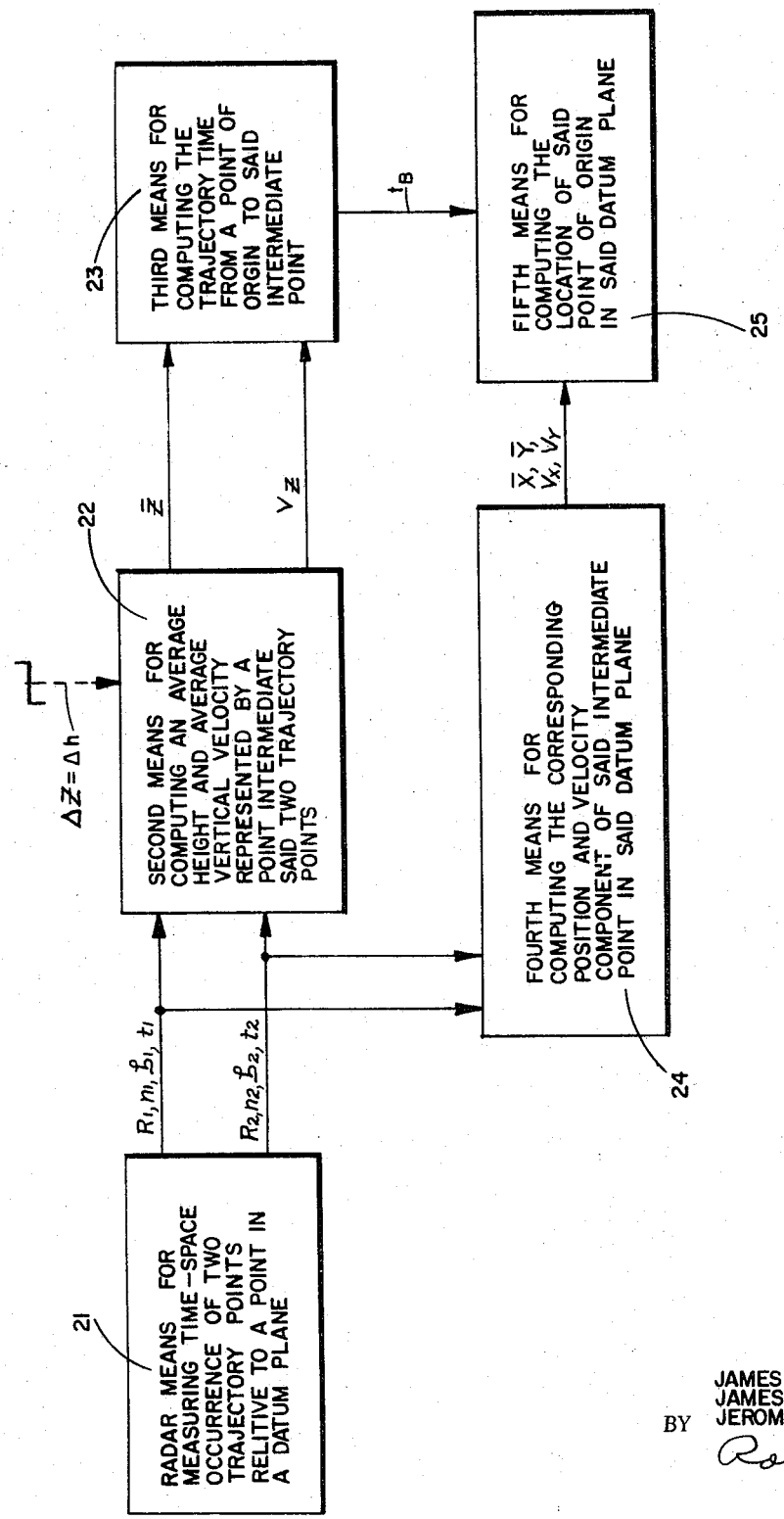
FIG. 2 is a block diagram of a system employing the concept of the invention, for solving the counter mortar weapon problem.

A system for so determining the point of origin in a datum plane of a body having a ballistic trajectory, is shown in FIG. 2.

Referring to FIG. 2, there is illustrated in block form a system employing the concept of the invention. There is provided radar means 21 for measuring the time-space occurrence of two mutually spaced points along a trajectory relative to a reference datum. Radar means 21 is preferably a stacked beam monopulse radar having two boresight axes which are scanned in azimuth by high-speed electronic scanning means. Radar means 21 is described more fully hereinafter and, accordingly, is shown in FIG. 2 in block form for convenience in exposition only.

There is further provided in the system of FIG. 2 computing means 22 in cooperation with radar means 21 for computing the point of origin of a ballistic trajectory, and comprising means 22 for computing an average height $\bar{Z}$ and average vertical velocity $V_z$ represented by a point intermediate the two trajectory points substantially in accordance with the respective relationships of Equations 9 and 12. Computing means 22 further includes provision for manually biasing the computed value for $\bar{Z}$ by a selected amount $\Delta Z$ corresponding to the estimated elevation difference between the terrain of the radar site and the site of the mortar. A third computing means 23 is responsively coupled to second computing means 22 for determining the trajectory time of flight from the trajectory point of origin to the intermediate point substantially in accordance with the relationship of Equation 19. Square root computing means for computing the first element of the right hand member of Equation 19, is taught in U.S. Patent No. 3,049,296, issued August 14, 1962, to Hertz et al. for a Binary Square Root Mechanization.

There is also provided a fourth computing element 24 responsive to radar means 21 for computing the corresponding projected position and velocity components of the intermediate point in the datum plane, in accordance with the respective relationships of Equations 7, 8, 10 and 11. A fifth computing element 25 is responsively coupled to third and fourth means 23 and 24 for computing the location of the mortar site, projected into the datum plane, substantially in accordance with the relationships of Equations 20 and 21.

High speed miniaturized digital computing means for performing such arithmetic operations are well known in the general purpose digital computing art. Therefore, the computing elements of FIG. 2 are shown diagrammatically in block form only. Although the above described computing technique has been described in terms of the determination of a hostile mortar site, the same general form of equations may be employed to determine the terminal coordinates or point of impact of one's own mortar shells, as is well understood in the art.

Figure 3:
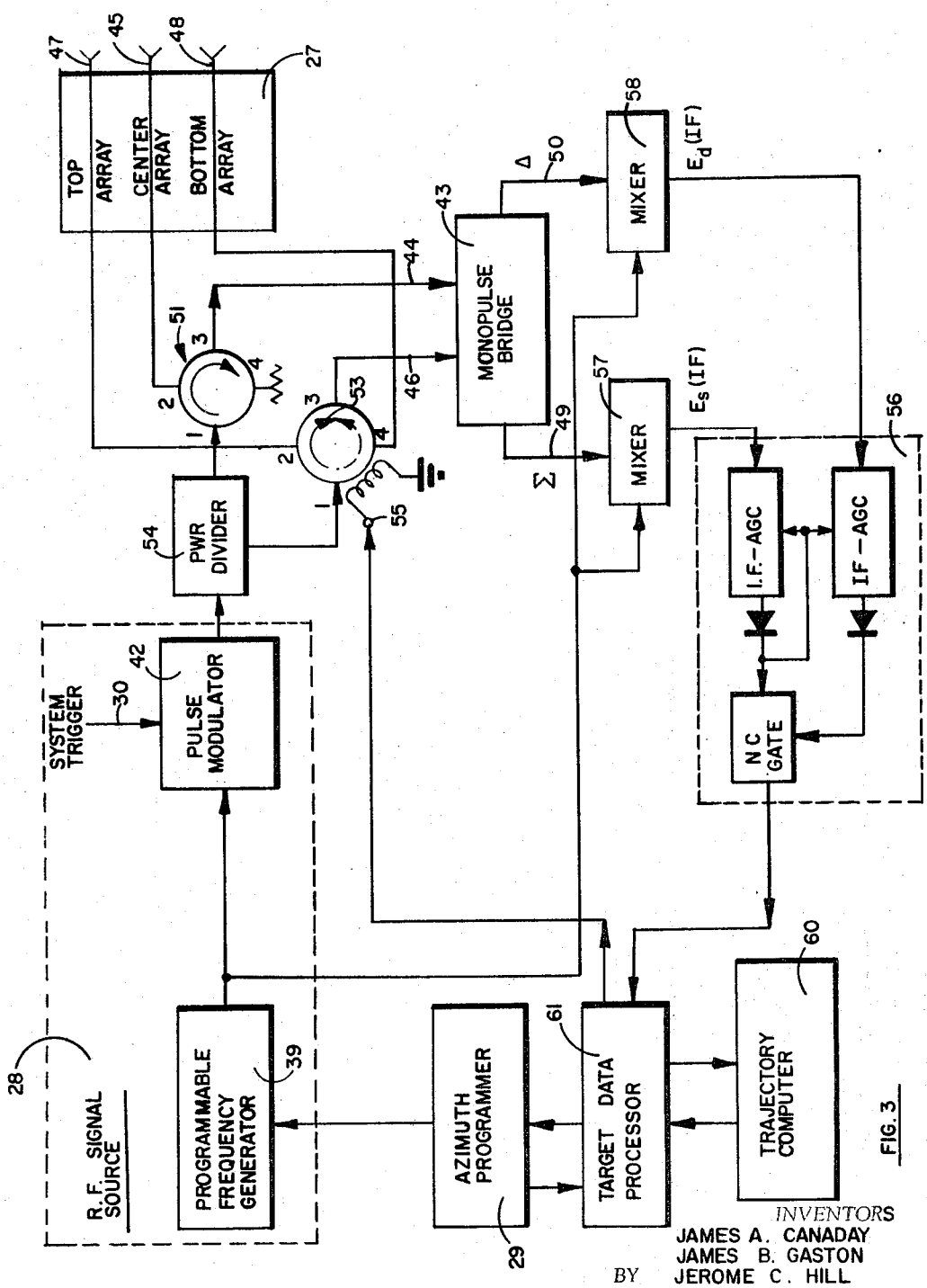
FIG. 3 is a block diagram of the radar system of FIG. 2.

A preferred arrangement of the radar means of FIG. 2 is shown in FIG. 3.

Figure 4:
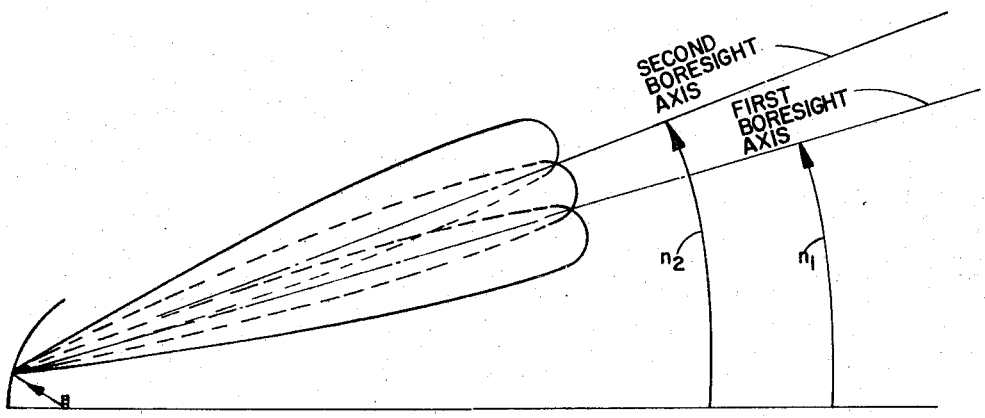
FIG. 4 is a side view of the stacked beam array provided by the antenna of FIG. 3.
Figure 5:
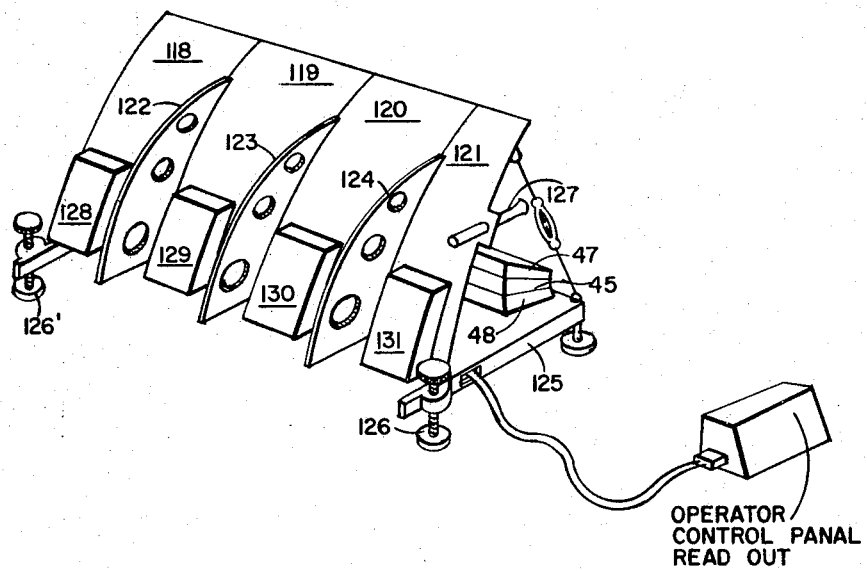
FIG. 5 is an isometric view of a portable radar system embodying the concept of the invention.

Referring to FIG. 3, there is illustrated in block form a preferred embodiment of radar means 21 of FIG. 2 for detecting the time-space occurrence of two points along the trajectory of a detected projectile. The radar system of FIG. 3 is shown schematically in cooperation with a trajectory computer 60 (corresponding to elements 22, 23, 24 and 25 of FIG. 2). Such radar system is comprised of an azimuthally-directional, frequency-scanned antenna 27 having an upper, lower and center feed or array for providing a vertically-stacked beam pattern comprising an upper, lower and center beam. The lower and center beams thereof define a first monopulse boresight axis, and the center and upper beams define a second monopulse boresight axis, as shown in FIG. 4. Such stacked beam pattern, having frequency-sensitive, azimuthally-directive properties, may be obtained by means of three similarly-constructed vertically-stacked, horizontal serpentine microwave radiating arrays, as shown in FIG. 5 in cooperation with a right parabolic cylindrical reflector. The large horizontal extent of the microwave arrays and reflector provide a highly directive narrow beamwidth in azimuth, while the cooperation of the vertical parabolic shape of the reflector with the microwave feedhorns, serves to limit the beamwidth in elevation, as is well understood in the art.

As shown in FIG. 5, the assembled radar system is comprised of a parabolic reflector comprising several disconnectible panels 118, 119, 120 and 121, including ribs 122, 123 and 124 for enhancing the structural stiffness thereof. The disconnectable panels are mounted upon the aft edge of a base 125 which may be similarly comprised of disconnectable panels (not shown). Base 125 also mounts three vertically stack arrays 45, 47 and 48 at the forward edge thereof, the underside (not shown) of base 125 providing the hybrid bridge and other microwave circuit elements and connections of the radar system of FIGS. 2 and 3. Plug-in type cannisters 128, 129, 130 and 131 containing a battery-operated power supply and the miniaturized solid state circuits for the radar, programmer and trajectory computer may be located at the backside of the reflector, as illustrated (or, alternatively on the underside of base 125) and adapted to cooperate with the circuit connections on the underside of base 125. Additionally, levelling means 126 and 126' and a sighting telescope 127 may be further provided for orientation of the device with respect to a selected reference. Accordingly, a light weight, disconnectible assembly is provided, the disconnectible elements of which may be easily transported as field packs by means of footsoldiers or field personnel into any type of terrain accessable on foot.

Figure 6:
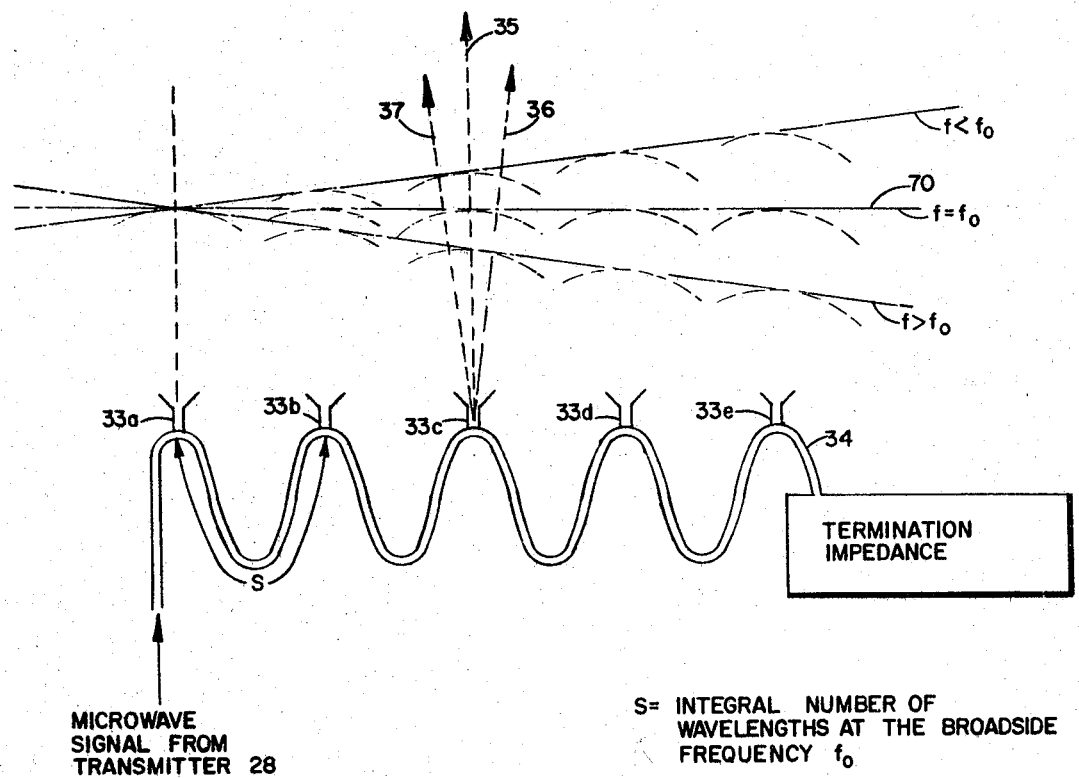
FIG. 6 is a diagram illustrating the variation in the direction of the phase-front radiated from a serpentine antenna array with variations in the frequency of the radiated energy.

The frequency-sensitive directional properties of such serpentine arrays (as employed in the block diagram of FIG. 3) may be more easily appreciated by reference to FIG. 6.

Referring to FIG. 6, there is illustrated schematically a microwave serpentine radiative array, comprising a lineal array of radiating elements 33 commonly connected to a source 28 of radio-frequency (RF) energy-to-be-transmitted by means of a folded microwave feed section 34 referred to as a serpentine feed section. A fixed lineal spacing is employed between successive elements of the array of radiating elements 33, while a fixed relative phase is employed between mutually adjacent feedpoints of the serpentine feed section to each of which a corresponding radiating element 33 is connected in microwave circuit. Where the fixed relative phase is equal to an integral number of wavelengths of a selected radio frequency, $f_o$, the energy transmitted from all of the radiating elements will be mutually in phase, thereby describing a planar wave front 70 parallel to the linear array, and travelling perpendicularly thereto. Such perpendicular or broadside direction 35 of propagation occurs only for such frequency $f_o$ for which the relative phase difference S corresponds to an integral number of wavelengths, which frequency is referred to herein as the broadside frequency.

If the frequency of the RF energy is changed, then the direction of relative phase angle between adjacent ones of successive radiating elements 33 is changed, thereby causing a change in the direction of propagation in the plane of the illustration of FIG. 6. For example, if the transmitted frequency $f$ is increased above the broadside frequency $f_o$, then the relative phase angle between successive radiating element is correspondingly increased by an incremental amount, whereby each successive element in increasingly delayed relative to that element nearest the RF source (element 28). Thus, for $f > f_o$, the direction 36 of propagation is toward the terminated end of the serpentine feed element 34, (to the right as illustrated in FIG. 6). Similarly, for transmitted frequencies less than the broadside frequency (i.e., $f < f_o$), the direction of propagation 37 is rotated toward the left or the input end of the serpentine feed. Hence, a selected transmitter frequency corresponds to a given azimuth direction for the antennas of FIGS. 3, 5 and 6; and azimuth scanning of the antenna can be achieved by simply progressively changing, or programming, the transmitter frequency.

The construction and arrangement of a serpentine or snake feed array is known in the art, a description of such a device being included in a published article "Survey of Electronically Scanned Antennas" by Harold Shnitkin, at pages 70 and 71 of the December 1960 issue of Microwave Journal, published by Horizon House, Inc., 1330 Beacon Street, Brookline, Massachusetts.

Referring again to FIG. 3, there is also provided a variable-frequency pulsed transmitter 28 coupled to antenna 27 for transmitting a carrier frequency which is progressively changed. Because of the frequency-responsiveness of the directivity of azimuthally directive antenna 27, antenna 27 is caused to scan by cyclically varying or programming the frequency of transmitter 28.

Transmitter 28 is comprised of a source 39 of a sequentially produced first and second selected radio frequency having a fixed frequency difference therebetween, corresponding to a preselected intermediate frequency. A programmable frequency generator 39 provides the first selected radio frequency in synchronism with the operation of a pulse modulator 42. Pulse modulator 42 periodically pulse modulates and amplifies the first one of the two RF frequencies to provide a source of pulsed RF energy to be transmitted by antenna 27.

There is further provided monopulse receiving means comprising a microwave hybrid bridge 43 having a first input 44 responsively connected to a center one 45 of the microwave radiative arrays, a second input 46 adapted to be connected to an alternative one of the upper and lower arrays 47 and 48 of antenna 27; and further having a first and second output 49 and 50 indicative of the respective sum of and difference between the applied inputs to bridge 43. The construction and arrangement of such microwave hybrid bridge is well known in the art, being described for example, in U.S. Patent No. 2,933,-980, issued April 26, 1960, to J. R. Moore et al. for an Integrated Fire Control Autopilot. Accordingly, bridge 43 is shown in block form only.

A first transmit-receive duplexer 51 couples the pulsed output of pulse modulator 42 to the center microwave array 45 of antenna 27, and further has a received signal output 3 connected to the first input 44 of microwave bridge 43. Duplexer 51 may be comprised of a ferrite circulator or like substantially unidirectional microwave conductive means known in the art for providing a transmit/receive (TR) switching function. The arrangement and operation of a ferrite circulator as a TR switch is more fully described, for example, in U.S. patent application Serial No. 281,973, filed May 21, 1963, now U.S. Patent No. 3,205,493, for a Microwave Switch, by Arthur E. Cohen, assignor to North American Aviation, Inc., assignee of the subject invention.

A second switchable transmit-receive duplexer 53 is interposed in microwave circuit between pulse modulator 42 and an upper and lower one of the microwave arrays of antenna 27, a transmit signal input 1 of duplexer 53 being connected to the output of pulse modulator 42 by means of a microwave power divider 54, and a received signal output 3 connected to the second input 46 of microwave bridge 43. A switching control terminal 55 of second duplexer 53 is adapted to be connected to a source 61 of two-state control signals for operatively connecting the switchable duplexer 53 to a selected one and disconnecting it from the other of the upper and lower arrays 47 and 48. Switchable duplexer 53 may be comprised of a four-port ferrite circulator, a first and third port of which correspond to a respective transmit and receive port, and the intermediate (second and fourth) ports of which are each connected to a mutually exclusive one of the upper and lower antenna arrays 47 and 48.

The substantially unidirectionally microwave conductive feature of a ferrite circulator is due to the polarity of the magnetic field provided by a magnetized ferrite element inserted in the circulator, as is well understood in the art. However, if electromagnetic means, such as a direct-current carrying conductor imbedded in or cooperating with the ferrite element, biases or reverses the sense of the magnetic field, then the direction of the unidirectional microwave conductivity of switchable circulator 53 is correspondingly reversed. Hence, in one state of circulator 53, pulsed energy is transmitted from modulator 42 through ports 1 and 4 to lower array 48, and received signals are transmitted from a lower array 48 through ports 4 and 3 to monopulse receiver bridge 43. When a switching signal, applied to terminal 55, reverses the state of circulator 53, then pulsed energy is transmitted from modulator 42 through ports 1 and 2 to upper array 47, and received signals are transmitted from upper array (reference numeral) 47 through ports 2 and 3 to bridge 43. A more complete description of a switching circulator is fully described in an article "Latching Ferrite Microwave Devices" by James D. Woermke and Jack A. Meyers, at pages 20–27 of the October 1964 issue of Microwave, published by Robert E. Ahrensdorf, 850 Third Avenue, New York, N.Y.

The monopulse receiving means of FIG. 3 also includes intermediate frequency processing means 56 for providing necessary amplification of the monopulse sum and difference signals, including signal normalizing means for reducing the effects of target range, size and reflective coefficient upon the received signals. Such signal normalizing may employ automatic gain control amplifiers tuned to the preselected intermediate frequency (IF) and having a gain control input commonly connected to the AGC sum signal output as a gain control signal as shown, for example, in FIG. 3.12 at page 57 of "Introduction to Monopulse" by Rhodes, published by McGraw-Hill (1959). Interposed between the sum and difference signal inputs to IF signalling means 56 are a respective one of microwave mixers 57 and 58 having a local oscillator input commonly connected to source 39 of the two sequentially-produced variable RF frequencies. The output frequency of frequency generator 39 during that portion of the pulse repetition interval subsequent to the transmitted pulse-width (provided by modulator 42) is a second frequency differing from the transmitted frequency by a preselected amount corresponding to a preselected IF frequency. Hence, the local oscillator input to mixers 47 and 48 is correspondingly varied as the transmitter frequency is programmed, to reduce the frequency of the sum and difference of the received echoes of the transmitted pulse to a preselected intermediate frequency.

Therefore, the arrangement of FIG. 3 comprises monopulse sum and difference receiving means commonly responsive to the center array and an alternative one of the upper and lower arrays of antenna 27 for providing signals indicative of the range and on-boresight conditions respectively of a detected target. Such on-boresight condition is indicated by the concurrent existence of a sum signal and a null-amplitude difference signal, and may be mechanized by the gating of a normally gated-on sum signal, which is gated off in response to a normalized difference signal having an amplitude in excess of the gate threshold. Such mechanization may be included either in receiver 56, as shown in FIG. 3, or in the target data processor 61, as shown in FIG. 14. If desired, the effects of jamming signals received through the side lobes of the antenna pattern may be suppressed by the inclusion of a small omnidirectional antenna arranged to cooperate with the monopulse receiver 56, substantially in accordance with the teaching of U.S. Patent No. 3,094,695 issued June 18, 1963, to J. M. Jahn for an Antenna Side Lobe Suppression System.

The frequency of transmitter 28 is changed by means of changing the frequencies generated by frequency generator 39, in response to frequency-select signals from antenna beam position programmer 29. Frequency generator 39 is comprised of a plurality of gated sources of reference frequencies such as crystal-controlled oscillators, the outputs of which are selectively gated and combined to obtain a desired frequency for a selected pulse repetition interval of the pulsed radar system, as shown in FIGS. 8a and 8b.

Figure 8A:
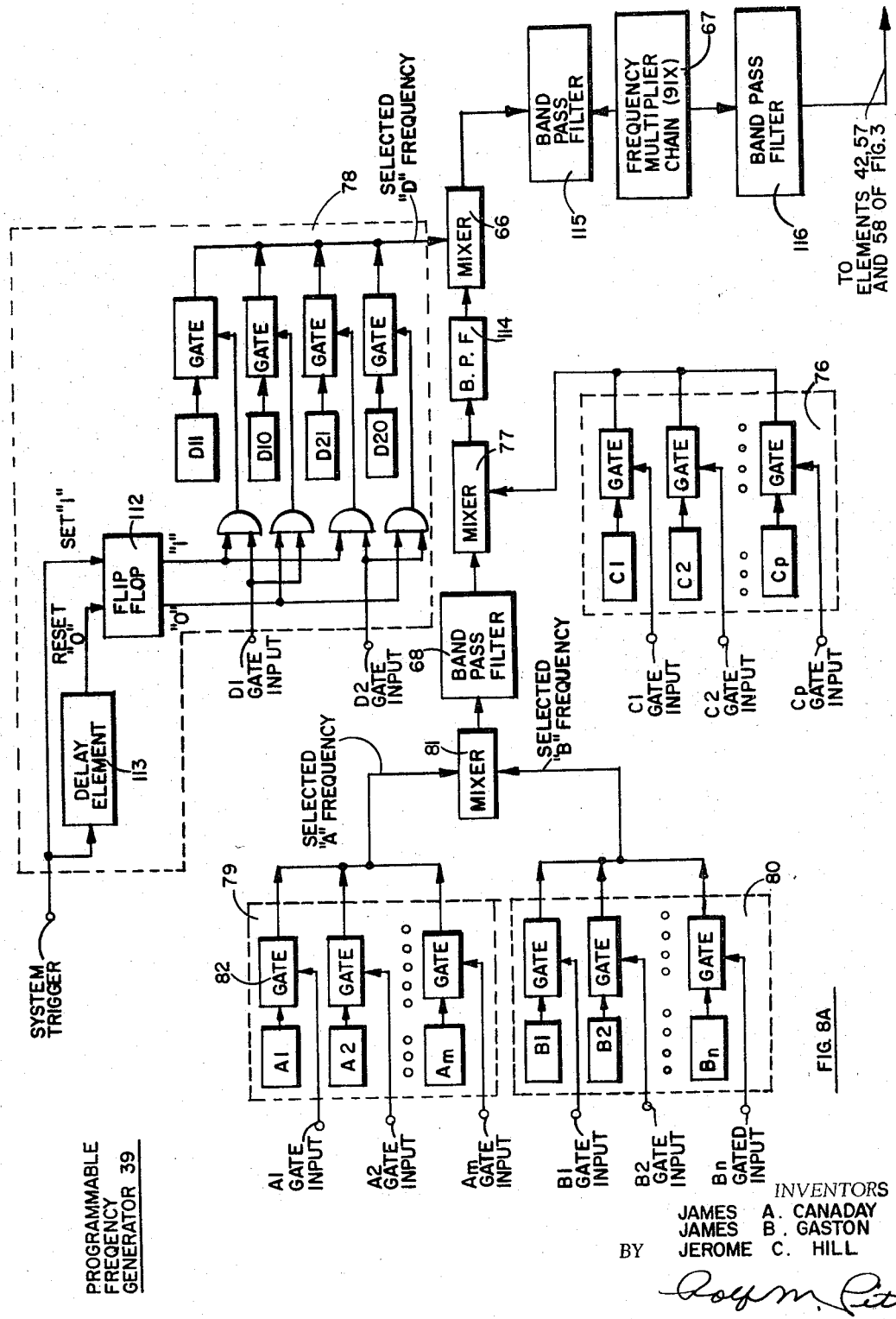
FIGS. 8a and 8b are block diagrams of the frequency generator of the transmitter of FIG. 3.
Figure 8B:
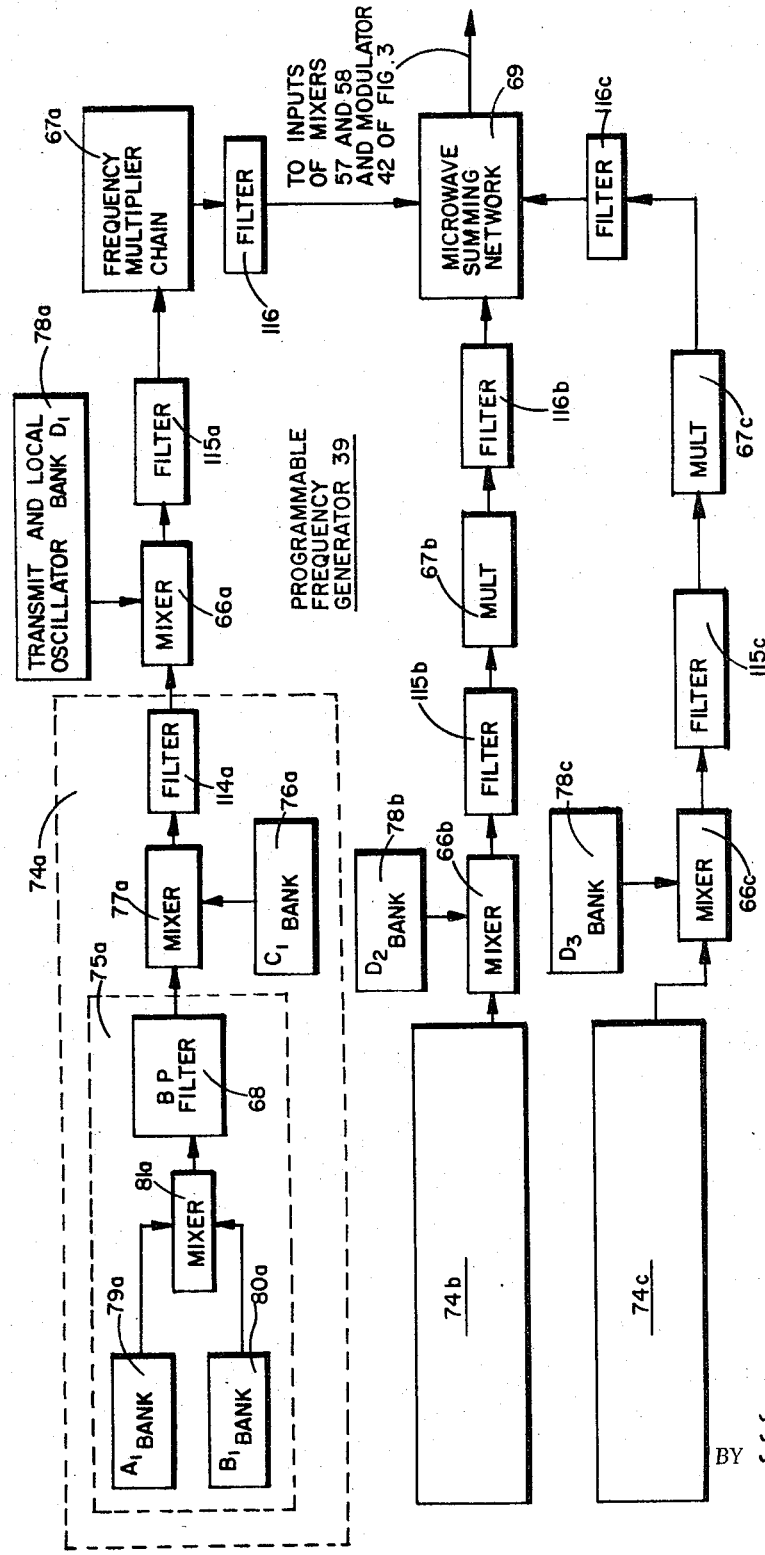

Referring to FIG. 8a, there is illustrated in block diagram form a preferred arrangement of the frequency generating means of FIG. 3.

There is provided a chain of oscillator banks comprising a series of combinations of a mixer coupled to a respective coarse and fine bank of gated oscillators, each combination of a coarse and fine bank comprising one bank of a successive combination of coarse and fine banks, each coarse bank being comprised of a preselected number of gated oscillators for providing a corresponding number of discrete frequencies spaced apart in the frequency domain by a difference frequency corresponding to the tuning band of an associated bank. For example, there is provided a first fine bank 80 or "B" bank comprised of a preselected number ($n$) of gated oscillators for providing a corresponding number of discrete frequencies spaced apart in the frequency domain by a first preselected frequency difference ($\Delta f_B$), the tuning band of such fine bank being thus equal to the product $n\Delta f_B$ of the associated frequency difference and number of discrete frequencies.

There is also provided a second course bank 79 or "A" bank of a preselected number ($m$) of gated oscillators for providing a corresponding number of discrete frequencies spaced apart in the frequency domain by a frequency difference corresponding to the tuning band of the "B" bank. A first mixer 81 responsive to a selected oscillator of each of the "A" and "B" banks of gated oscillators provides an output having a frequency indicative of the frequency difference between the inputs thereto.

Hence, the two banks 79 and 80 of gated oscillators are used to generate a total number of frequencies equal to the product ($mn$) of the number of oscillators in each bank. Such large number of frequencies is obtained with such a relatively small number of oscillators by preselecting the frequencies of successive ones of the oscillators in each bank, whereby the frequency difference between adjacent ones of the fine control oscillators of bank 80 represents a desired minimum frequency increment, and the frequency difference between adjacent ones of the coarse control oscillators of bank 79 is equal to the fine control oscillator frequency difference or increment multiplied by the number of oscillators in the fine control frequency bank 80. A desired crystal-controlled output frequency is then generated by difference-mixing a selectively gated one of the fine frequencies with a selectively gated one of the coarse frequencies at a mixer 81. In other words, each of the oscillators of banks 79 and 80 are operated continuously, rather than turned on and off, to insure stable operation; and selected oscillator outputs are selectively gated by gating signals from programmer 29 applied to an associated one of the gates in each of banks 79 and 80.

Mixer 81 not only generates the desired difference frequency ($B_1-A_1$), but also generates a spurious spectrum of harmonics and harmonic sum and difference frequency signals. It is important to minimize the spurious frequency content of the differentially mixed frequencies because they degrade radar performance. The inherent operation of frequency multiplier 67 (described more fully hereinafter) tends to enhance such spurious frequency relative to the desired signal. By carefully selecting the frequencies to be mixed, and bandpass filtering the mixed frequencies, the energy content at such spurious frequencies may be minimized. For example, the preselected ten fine frequencies of oscillator bank 80 may cover the range of frequencies between 115.55719 mc. and 115.77477 mc., and the preselected ten coarse frequencies of oscillator bank 79 may cover the range of frequency between 5.41482 mc. and 7.59064 mc. The principal difference frequencies would lie between 107.96655 mc. and 110.35995 mc., while the spurious frequencies would lie outside such bandwidth. Accordingly, a filter 68 having a band pass covering the selected range of difference frequencies between 107.966 mc. and 110.360 mc. would attenuate signal frequencies outside such frequency range. In this example, the lowest order spurious frequency in the passband is the fifteenth (15 times A10).

There is further provided successive "C" and "D" banks of gated oscillators for extending the range of frequencies obtained by the chain of oscillator banks shown in FIG. 8. The third bank 76 or "C" bank of gated oscillators provides a third preselected number of discrete frequencies spaced apart in the frequency domain by a third preselected frequency difference. The combination of the A and B banks 79 and 80 comprise a coarse bank 75 (as shown more clearly in FIG. 8b) which cooperates with fine "C" bank 76, by means of a mixer 77 to provide a smaller frequency increment within the tuning band.

Similarly, "D" bank 78 comprises dual banks of oscillators, oscillators D10 and D20 comprising a first bank and oscillators D11 and D21 comprising a second bank. Each of the dual banks provides a like preselected number of discrete frequencies spaced apart in the frequency domain by an amount corresponding to the product of the coarse preselected frequency difference and preselected number of discrete frequencies provided by "A" bank 79. The frequencies of corresponding oscillators of the dual banks of oscillators (say D11 and D10, for example) are spaced apart in the frequency domain by an amount corresponding to a preselected IF receiver frequency. Hence, the combination of A, B and C banks 79, 80 and 76 comprise a fine bank 74 (as shown more clearly in FIG. 8b) which cooperates with coarse bank D78 by means of a mixer 66.

Associated with each of mixers 77 and 66 is a bandpass filter 114 and 115 for passing a preselected bandpass of the mixer output corresponding to a desired bandwidth, free of spurious frequencies, similar to the above described function of filter 68.

The output of mixer 66 is multiplied by a frequency multiplier chain 67 to provide the desired microwave frequency range, which microwave energy is coupled to the transmitter modulator 42 and receiver mixers 57 and 58 of FIG. 3. Such multiplier may be comprised, for example, of a step-recovery diode multiplier circuit, a description of which may be found in the article "Harmonic Generation, Rectification, and Lifetime Evaluation of the Step Recovery Diode" by S. Krakauer in the Proceedings of IRE, vol. 50, 1962. In an exemplary arrangement, a first and second multiplier stage providing a respective multiplication factor of 7:1 and 13:1 is used to achieve a net muliplication factor of 91 with a minimum of spurious frequency content, which content is easily rejected by filtering (by means of a bandpass filter 116).

In normal operation of the "D" dual banks of oscillators (of FIG. 8a), an alternate one of gated oscillators D11 and D21 is gated on in synchronism with the operation of pulse modulator 42 (of FIG. 3), to control the transmitted frequency which is pulse modulated by the pulse modulator, and a corresponding one of gated oscillators D10 and D20 is gated on for the remainder of the system pulse repetition interval to provide a subsequent receiver local oscillator frequency which converts received echoes of the transmitted pulse to a preselected intermediate frequency. For example, oscillator D11 is gated on by the coincidence of the system trigger ("1" state of flip-flop 112) and a D1 gate input applied to a D11 logic AND gate. Upon a preselected delay, provided by a delay element 113 and corresponding to a preselected transmitter pulsewidth, flip-flop 112 is reset to the "0" state, which gates off oscillator D11. Such "0" signal state is applied to a D10 logic AND gate, together with the D1 gate input, for gating on oscillator D10 for the remainder of the pulse repetition interval. A similar operational cycle occurs for oscillators D21 and D20 during the subsequent pulse repetition interval, in response to the system trigger and a D2 gate input. Such time-shared arrangement of providing a transmit frequency and receiver local oscillator frequency is preferred over the prior art technique of mixing an intermediate frequency oscillator output with the programmed transmitter frequency, for the reason that the spurious frequency problem created by such last mixer stage is avoided. In other words, the complexity, cost and weight of a wideband single sideband modulator is avoided.

Where it is desired to extend the frequency tuning band obtainable, while preserving the resolution or minimum frequency increment provided by the chain of oscillator banks of FIG. 8a, a plurality of such chains of oscillator banks may be employed, each chain providing a contiguous portion of a desired tuning band of staircase frequencies, as shown in FIG. 8b, the microwave outputs of which are combined or commonly fed to microwave summing means 69.

For an exemplary system comprising three chains of oscillator banks, as shown in FIG. 8b, and employing a frequency multiplication ratio of 91:1 and an IF receiver frequency of 50 mc., a suitable set or staircase of oscillator frequencies is tabulated as follows:

|  | First Chain, mc. | Second Chain, mc. | Third Chain, mc. |
|---|---|---|---|
| A Bank: |  |  |  |
| A1 | 5.41482 | 5.49176 | 5.56852 |
| A2 | 5.65658 | 5.73352 | 5.56852 |
| A3 | 5.89834 | 5.97528 | 6.05204 |
| A4 | 6.14010 | 6.21704 | 6.29380 |
| A5 | 6.38185 | 6.45880 | 6.53556 |
| A6 | 6.62361 | 6.70056 | 6.77732 |
| A7 | 6.86537 | 6.94231 | 7.01907 |
| A8 | 7.10713 | 7.18407 | 7.26083 |
| A9 | 7.34889 | 7.42583 | 7.50259 |
| A10 | 7.59064 | 7.66759 | 7.74435 |
| B Bank: |  |  |  |
| B1 | 115.55719 | 118.19895 | 120.83441 |
| B2 | 115.58137 | 118.22313 | 120.85859 |
| B3 | 115.60555 | 118.24730 | 120.88276 |
| B4 | 115.62972 | 118.27148 | 120.90694 |
| B5 | 115.65390 | 118.29566 | 120.93112 |
| B6 | 115.67807 | 118.31983 | 120.95529 |
| B7 | 115.70225 | 118.34401 | 120.97947 |
| B8 | 115.72642 | 118.36818 | 121.00364 |
| B9 | 115.75060 | 118.39236 | 121.02782 |
| B10 | 115.77477 | 118.41653 | 121.05199 |
| C Bank: |  |  |  |
| C1 | 5.49182 | 5.56653 | 5.64105 |
| C2 | 5.49988 | 5.57459 | 5.64911 |
| C3 | 5.50794 | 5.58265 | 5.65717 |
| D Bank: |  |  |  |
| D10 | 5.33187 | 5.40440 | 5.47099 |
| D11 | 5.88132 | 5.95385 | 6.02944 |
| D20 | 5.33590 | 5.40843 | 5.47502 |
| D21 | 5.88535 | 5.95788 | 6.02447 |

The azimuth direction of the boresight axis of antenna 27 (in FIG. 3) is caused to scan by cyclically varying or programming the frequency of transmitter 28, by means of a programmer 29, in response to information from target data processor 61 and computer 60. The angular rate at which the azimuthally-directive antenna beam is required to be scanned in azimuth must be fast enough so that mortar shells cannot pass through planes 72 or 73 (of FIG. 7) undetected, at usual ranges (about 500 to 1200 meters). (It is to be noted that the shorter the observed range, the less time required for the projectile to pass through the beams.) Such scan rate is provided over a preselected azimuth sweep sector such as 800 mils, for example, by selectively programming transmitter frequency increments corresponding to changes in azimuth which are less than the azimuth beamwidths (i.e., the overlapping beamwidths of successive pulse repetition periods scan the sector at the desired rate). A representative set of radar system requirements for an automatic counter-mortar application for an 800 mil sector and an elevation beamwidth of $31.4 \times 10^{-3}$ radians is as follows:

Azimuth beamwidth: 32 mils
Azimuth scan rate: 4.5 mils per pulse repetition period (1/PRF)
PRF: 6,000 pulses per second
Pulsewidth: .25 microsecond
Peak power: 50 kw.

Figure 7:
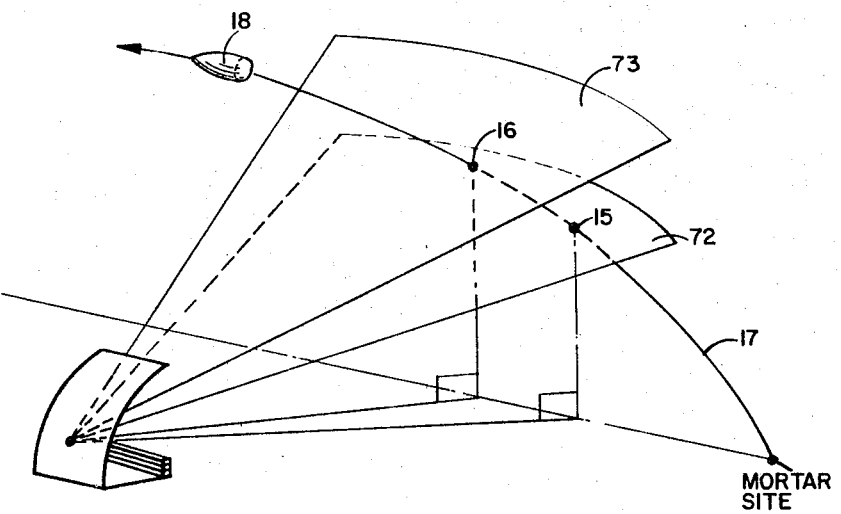
FIG. 7 is an isometric view of the surveillance planes provided by the azimuthally swept on-boresight monopulse data device of FIG. 3.

The on-boresight sweep pattern provided by the cooperation of antenna 27 with a swept frequency transmitter resembles two inclined planes or surfaces 72 and 73, each inclined at a mutually exclusive one of the boresight elevation angles, $\eta_1$ and $\eta_2$ of FIG. 4, as shown in FIG. 7. However in order to reduce the total transmitter power requirement and thereby reduce the weight of the system, the antenna cooperates with the receiver and transmitter of FIG. 3 to provide only one of the swept patterns shown in FIG. 7.

For example, where it is desired to detect the initial upwardly directed portion of a hostile mortar shell trajectory by means of a forward located system (the system is located near the enemy mortar location), the center and lower feed horns of antenna 27 (in FIG. 3) are employed to provide an azimuthally scanned surveillance area corresponding to area sector 72 of FIG. 7. Upon the detection of a target passing through such area (in an upwardly direction of travel), corresponding to a first trajectory point 15, beam switching duplexer 53 is caused to switch off the lower feedhorn 48 and switch on the upper feedhorn 47 of antenna 27 (of FIG. 3), to provide a scanning of the upper surveillance area 73 of FIG. 7, to obtain a second trajectory point 16 (in FIG. 7). Such switching of duplexer 53 is provided by target data processor 61 in response to received signals from monopulse receiver 56, corresponding to a null monopulse difference signal associated with a sum signal having a finite amplitude other than a null.

Such upwardly direction of such initial portion of the trajectory is not only indicated by the subsequent occurance of the second trajectory point 16, within a preselected time interval, but may also be predicted by the sense of the rate of change of the normalized monopulse difference signal (e.g., the sense of the vertical direction by which the detected projectile intercepts the search plane 72.) If the sense of the rate of change of the target elevation angle off-boresight is positive ($sgn\bar{\beta}$ = positive), indicating an upward direction of the projectile during such observed portion of its trajectory, it is to be expected that it will intercept the upper surveillance plane 73 *subsequent* to its intercepting the lower surveillance plane 72, and data for a second trajectory point 16 may be obtained.

If the sense of $\bar{\beta}$ is negative, then no such subsequent intercept will occur, and no second trajectory point need be expected. Such case indicates the terminal portion of the trajectory (e.g., the projectile is downwardly moving). Therefore, the radar system should be made to scan the upper pattern 73 of FIG. 7 to first intercept the next projectile (from the mortar-to-be-located) and then, upon such intercept, be switched to the lower pattern 72. Exemplary arrangements of the azimuth programmer 29 and target data processor 61 of FIG. 3 are respectively shown in FIGS. 9 and 14.

Referring to FIG. 9, there is shown an exemplary arrangement of the programmer 29 of FIG. 3 for converting a digital azimuth signal into frequency select gating signals, whereby the oscillators of frequency generator 39 (in FIG. 3) may be selectively gated. While the azimuth direction of the antenna beam is controlled by the programming of the transmitter frequency, the actual azimuth beam position is generally a nonlinear function of frequency, as is well understood in the art. Accordingly, suitable angle-to-frequency conversion is required in the program provided by the programmer of FIG. 9, and may be provided by well known means such as a diode matrix 83 in cooperation with a frequency register 84. Frequency-select logic 85, responsive to register 84 provides separate gating signals to a selected one of the oscillator gates 82 in each of oscillator banks 76, 78, 79 and 80 (of FIG. 8a). If desired, temperature compensation may also be included, for providing a compensatory incremental frequency input to register 84, as shown by dotted block 86, to compensate for a variation in azimuth resulting from antenna geometry changes due to antenna temperature.

A digital azimuth input to diode matrix 83 is provided by a mutually exclusive one of three gated azimuth registers 101, 88 and 89. Although the inputs to matrix 83 from registers 101, 88 and 89 are illustrated for convenience as a single line flow diagram it is well understood in the art that such inputs may comprise a plurality of binary-coded input lines. Similarly, the inputs to register 84 from matrix 83 and temperature compensation block 86 are a plurality of digitally coded input lines, conveniently indicated as a single line flow diagram, the digitally coded input representing that frequency (or frequency change) corresponding to the input from an associated matrix. The output of frequency register 84, while shown as a single line flow diagram, is similarly a plurality of binary coded output lines, the signal states thereof corresponding to a temperaure compensated frequency selection, which is converted by logic element 85 into an appropriate combination of switching control signals for switching-on an appropriate combination of oscillators for generating the selected frequency.

In the search mode of the programmer, the "A" and "B" counters 88 and 89 are used alternatively to provide a degree of frequency agility. Such frequency agility or large difference between two sequential transmitter pulse repetition intervals may be desired to reduce the response of the system to second-time-around echoes (troublesome distant echoes from a preceding transmitter pulse which are not received until a subsequent pulse interval and which provide anomalous range indicators). The clock rate input to an "A" flip-flop 90 causes a preselected incremental azimuth input to be made by an alternate one of Add Instruct elements 91 and 92 to an associated one of "A" and "B" counters 88 and 89, representing a discrete change in the discrete azimuth program for a selected pulse repetition interval, the output of an alternate one of counters 88 and 89 being gated into matrix element 83, as may be more clearly appreciated from a consideration of FIG. 10.

Figure 10:
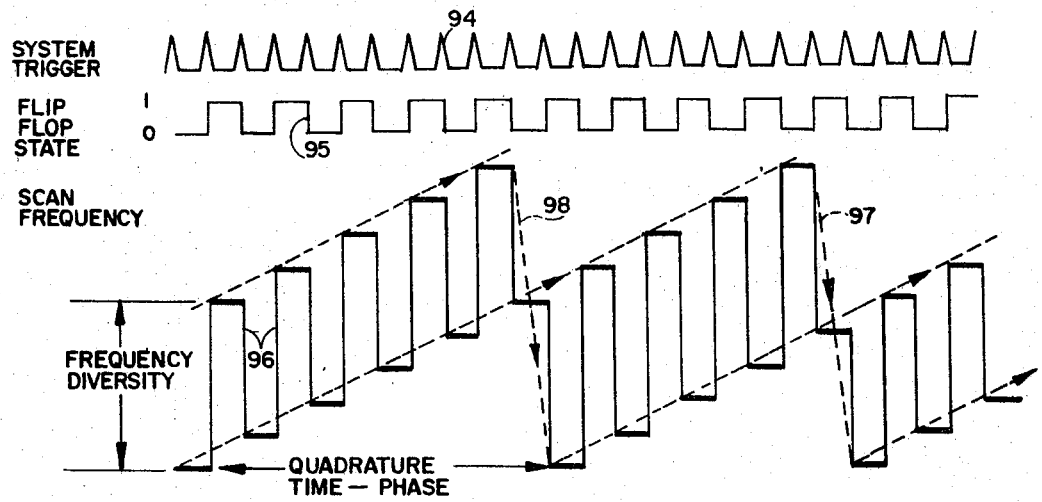
FIG. 10 is a family of time histories of the response of the programmer and frequency generator of FIGS. 3, 8 and 9 during the search mode.
Figure 11:
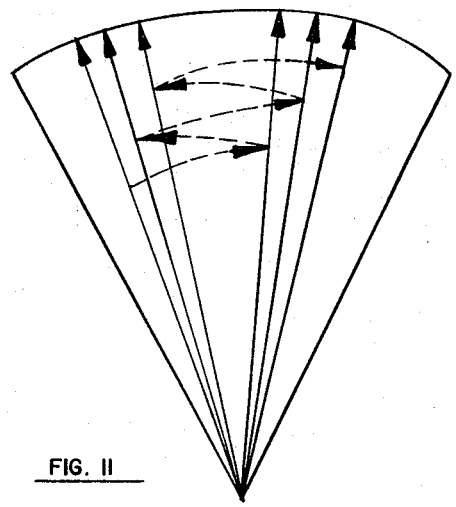
FIG. 11 is a diagram of the scanning pattern resulting from the search-mode depicted in FIG. 9.

Referring to FIG. 10, there is illustrated a family of time-histories of the responses of several elements of the arrangement of FIG. 9. Curves 94 and 95 represent the respective time responses of the system trigger input to flip-flop 90 and the associated output state thereof, illustrating the frequency divider action of flip-flop 90, whereby alternate ones of counters 88 and 89 are programmed on during sequentially successive pulse repetition intervals. Curve 96 represents the output of frequency register 84 in response to the time-shared programming of gated counters 88 and 89. Locus 97 represents the component, or time-shared, response of register 84 to counter 88, and locus 98 represents the component response to counter 89. As each of counters 88 and 89 completes its scan (the counter becoming full upon completion of the 800 mil traverse), reset means 99 responds to the last digit thereof to reset the counter, as is well understood in the art. In this way, the counter unidirectionally and cyclically scans the preselected azimuth sector. By partially loading up one of counters 88 and 89 so that it is half full when the other is empty, the periodic reset intervals of each is made to occur in a substantially two-phase or quadrature time-phase relation to the other, as shown in FIG. 10. Hence, the staircase of sequential frequencies produced by the alternate operation of counters 88 and 89 differ by a selected amount equal to one-half the scanned frequency range and corresponding to one-half the scanned azimuth sector. Such mode of operation results in two time-shared scanning patterns as shown more clearly in FIG. 11, whereby the clockwise scanning pattern illustrated at the left of the sector corresponds, for example, to locus 97 of FIG. 10, and the clockwise scanning pattern illustrated at the right correspond to locus 98. Accordingly, the search mode response of the radar system of FIG. 3 to second time-around echoes is doubly attenuated due to the change in local oscillator frequency reducing (1) the responsiveness of the receiver to such echo frequencies, and (2) the responsiveness of the receiver to the azimuth direction of such second-time-around echoes.

When a target is detected during the search mode described above, as manifested by a sum channel input to target data processor 61 of FIG. 3 (and shown more fully in FIG. 14), data processor 61 responds thereto by storing the data relative to the range and direction of the target, and by sending a control signal to the beam-select duplexer 53, to change the state thereof. The data processor logic also transmits the stored azimuth $\zeta_i$ at which the first intercept occurred to gated intercept register 101, which is gated on by a gating signal $A_L$ from processor 61. Thus, the second scanned boresight axis of the system antenna would be turned on and the scanned boresight axis on which the first intercept occurred would be turned off, as shown in FIGS. 12 and 13.

Figure 12:
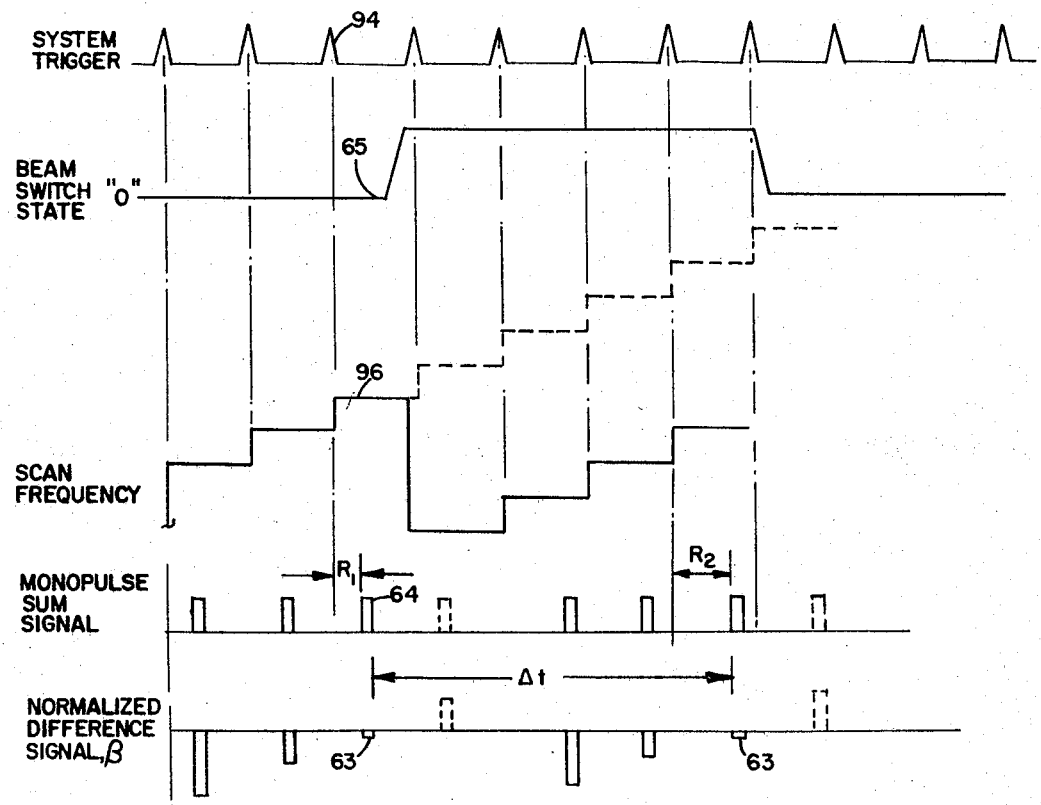
FIG. 12 is a family of time histories of the response of the beam switching duplexer programmer and frequency generator of FIGS. 3, 8 and 9 during the intercept mode.
Figure 13:
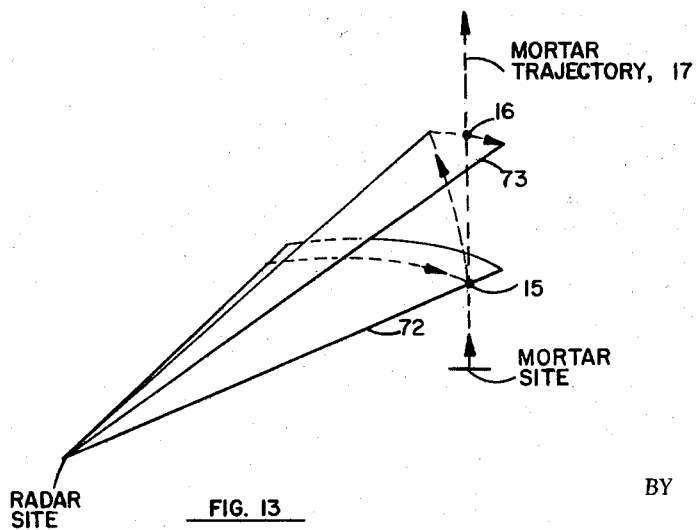
FIG. 13 is a diagram of the scanning pattern resulting from the intercept mode depicted in FIG. 11.

Referring to FIG. 12 there is shown a family of time histories of several elements of FIG. 3. The time-scale has been exaggerated and the time-shared aspect of the scan frequency represented by curve 98 has been omitted for convenience in exposition. When the scanned frequency (curve 96) causes the antenna azimuth to scan through the direction of a target (indicated by the occurrence of monopulse sum and difference signals during a first or "0" state of the beam switching duplexer), the monopulse difference signal (curve 63) goes through zero. Such null difference signal 63 for such beam switch state corresponds to the elevation direction of a preselected one of the two elevated planes 72 and 73 of FIGS. 7 and 13 (say, angle $\eta_1$ of plane 72). The time delay of the sum signal 64 relative to the system trigger corresponds to the range $R_1$ of the detected target, and the frequency represented by curve 96 during such pulse repetition interval corresponds to the azimuth direction $\zeta_1$ of the intercepting point 15 of FIGS. 1 and 13.

In response to such initial intercept, processor 61 provides a set of intercept mode control signals, transmitting a change-of-state signal to beam switching duplexer 53 (of FIG. 3), as indicated by the first discontinuity occurring in curve 65 (in FIG. 12); and also provides a concomitant bias in the scanned frequency (curve 96), which frequency bias corresponds to a retrograde bias in the azimuth scan program. The purpose of such retrograde azimuth bias in the azimuth scan is to assure that a first detected projectile having an azimuth rate of opposite sense to the radar scan rate will not escape a second detection in the second surveillance plane 73 (as illustrated in FIG. 13). In other words, the scanning motion to the right illustrated in FIG. 13 would assure that a projectile first detected at point 15 in lower plane 72 would, if also travelling to the right, be again detected by a switched beam as the projectile intercepted the upper surveillance plane 73 at a point to the right of first point 15; but where the projectile course is to the left of the first intercept point 15 (as illustrated in FIG. 13), then it is necessary, upon beam switching to the upper beam, to back-up before continuing the unidirectional azimuth scan. In this way, for the selected beam width and scan rate specified above, detection of the subsequent second intercept 16 is better assured.

Such aspect of the azimuth program for the intercept mode is provided for, in the arrangement of the programmer of FIG. 9, by a gated intercept azimuth register 101 and by a mode selected flip-flop 102 which is switched from the search (S) mode to an intercept ($\bar{S}$) mode in response to a mode select signal $A_I$ from the target data processor 61.

A simplified block diagram of the target data processor 61 which cooperates with the programmer of FIG. 9 for providing control of the system of FIG. 3, is shown in FIG. 14.

Referring to FIG. 14, there is illustrated in block form a simplified arrangement of the target data processor of FIG. 3. There is provided monopulse on-boresight data processing means comprising a normally closed gate 107 responsively coupled to the normalized monopulse difference signal output of receiver 56 for gating off a monopulse sum signal output thereof when the difference signal exceeds a preselected null threshold (where such gating means is preferred to be included in the target data processor, rather than in the receiver 56 of FIG. 3).

Such gated sum signal, indicative of an on-boresight detected target, is fed to beam switching logic 108, program control logic 109, a range counter 110, and a target determination and data storage element 111; and is a primary input for the generator of the mode-select signals generated by the target data processor of FIG. 14 for control of the system of FIG. 3. The range counter 110 provides a digital range signal, corresponding to the range of the on-boresight detected target, to target storage element 111, which also stores the associated azimuth direction $\zeta_t$ of the detected target and the logic state of beam switching logic 108 (corresponding to an associated elevation angle of the detected target). Such range counter output, as stored by target data element 111, may also be employed in logic element 109 for range-gating purposes in the detection of a second intercept point, as is well understood in the art. Hence, provisions for frequency diversity would need not be included in the intercept mode, in order to avoid second-time-around echoes.

The program control logic 109 transmits the value $\zeta_i$ of the first intercept azimuth (stored in storage element 111) to the programmer of FIG. 9, together with an intercept load register signal $A_L$, register bias signal $A_{32}$, and intercept mode signal $A_I$, in response to the gated monopulse sum signal indicative of a first intercept. Beam switching logic 108 similarly switches the state of beam switching duplexer 53 of FIG. 3, in response to such monopulse input signal.

In the system intercept mode, the intercept azimuth $\zeta_i$ (of the azimuth signals $\zeta_t$ fed to the processor of FIG. 14 from the programmer of FIG. 9), is loaded into the gated intercept register 101, the input to which is gated on by a register loading signal $A_L$ from the processor; and the intercept azimuth amount $\zeta_i$ biased by a preselected input (corresponding to the antenna beamwidth) from Subtract Instruct element 106 in response to an input $A_{32}$ from the target data processor. Also, mode select flip-flop 102 (in FIG. 9) is switched from the search (S) state to the intercept ($\bar{S}$) state in response to a mode select signal $A_I$ from the target data processor 61. Such change in state of mode select flip-flop (in FIG. 9), in cooperation with counter gates 103 and 104, gates off A and B counters 88 and 89; and, in cooperation with register gate 105, feeds the output of intercept register 101 to matrix 83. The register is programmed by periodic clock rate inputs from Add Instruct element 117. Therefore, antenna 27 (of FIG. 3) continues to scan in accordance with the output of register 101, to provide the subsequent intercept mode time history shown in FIG. 12.

Although the illustrated time histories of FIG. 12 show only one target return from the target during the on-boresight condition, such representation is for convenience only. A number of on-boresight target returns is to be expected (over a corresponding number of pulse repetition intervals) for the preselected null threshold of a specific radar design, which target returns may be averaged by the target data processor (of FIG. 14) for determination of an average observed azimuth, and to better distinguish a target of interest from spurious targets, by data processing means well understood in the art.

Upon the subsequent detection of the second intercept point during the intercept mode, illustrated for example in FIG. 7 as point 16 in plane 73 and in FIG. 12 by a second null of monopulse difference signal 63 during a second state of curve 65, second range $R_2$, and a second azimuth $\zeta_2$ (indicated by a corresponding second intercept amplitude of frequency curve 96), all occurring at a time $\Delta T$ subsequent to the first intercept point, the data is recorded in data storage element 111 of FIG. 14; and the system scanning cycle is repeated by resetting the states of logic elements 108 and 109 in FIG. 14 in order to detect, and determine the two intercept points of, subsequent projectiles similarly fired. The stored data (in storage element 111 of FIG. 14) relative to the two intercept points (points 15 and 16 of FIG. 13) is fed by data processor 61 to computer 60 of FIG. 3 which performs the necessary arithmetical operations to calculate and read-out the coordinates of the mortar site.

If no subsequent second intercept occurs within a preselected time interval not exceeding a single azimuth sweep period; this indicates that the projectile may have been proceeding from the initial elevation angle in a direction away from the second elevation angle. In other words, the projectile may have been coming *from* plane 73 toward point 15 in plane 72 (in FIG. 7), and further projectiles may be contemplated from such direction. Accordingly, upon the failure of a second intercept within such preselected period, the initial intercept data is erased from data storage element 111 of the target data processor (FIG. 14), and the search mode is commenced on the upper beam (e.g., the "S" state of the programmer mode-select flip-flop 102 in FIG. 9 is reset and the beam switch state of duplexer 53 of FIG. 3 is *not* reset by logic 108 of FIG. 14). If no target is detected in either upper or lower scan sectors 72 and 73 (of FIG. 7), the system continues to cyclically scan a preselected one of the two sectors.

Because the computer means for performing such arithmetic computations, and the processor logic for processing the radar signals may be achieved by any one of a number of combinations of known logic and arithmetic devices, elements 60 and 61 of FIG. 3 are not described or shown in any further detail herein. Because of the speed at which such computations can be made, the data for a number of targets may be computed concurrently, the limitation as to the number of targets being determined by the computer memory and the capacity of target data storage element 111.

Accordingly, a counter-mortar radar system has been described for the detection of two points on the trajectory of a mortar shell, as to be useful in the automatic determination of either the location of the point of impact thereof or the location of the mortar weapon which fired such shell. The cooperation of the three vertically-stacked, azimuthally-scanned, highly directional beam arrays provide light weight, inertialess-scanning monopulse means for accurately determining such two trajectory points; while the provision of beam switching from one to the other of an upper and lower beam in response to a detected target provides additional economies in power, weight and bulk, and also provides further information as to the vertical direction of a trajectory intercept. Further, such trajectory measurement means does not rely on the human operator for data transport and data processing function, as to avoid accuracy limitations imposed by the degree of operator skill, fatigue, and the like. The principal functions to be performed by the operator are merely the selection of a computer mode (corresponding to either calculating the point of impact of one's own shells or the location of an enemy mortar site), inserting an estimated elevation difference between the site of interest and the radar site into the computer, and relaying the computer read-out information to a remote point of data utilization. Where desired, a digital data link may be employed, in lieu of a human operator, to relay the read-out information to the remote point of utilization.

Because of the light weight and small size of the disclosed counter mortar radar, it cannot only be as easily deployed as a mortar weapon itself, but can be situated for use in optimum terrain situations, such as behind hillocks and the like, which tend to reduce the occurrence of ground clutter at the usual ranges of interest (e.g., ranges beyond such terrain feature), thereby providing improved effectiveness of the device in the field. Also, because of the frequency diversity features of the device, it is less susceptible to ECM jamming techniques. Further, because the high-speed automated operation of the device and its adaptation to cooperate with a computer memory, multiple target handling capabilities are provided.

Hence, the disclosed counter mortar radar is highly effective in providing the combined features of high-speed automatic operation, increased precision, improved mobility, and multiple target handling capabilities.

Although the invention has been described and illustrated in detail, it is to be clearly understood that the same is by way of illustration and example only and is not to be taken by way of limitation, the spirit and scope of this invention being limited only by the terms of the appended claims.

We claim:
1. Radar means for detecting the time-space occurrence of two points in the trajectory of a detected projectile comprising
    an azimuthally-directional, frequency-scanned antenna comprising an upper, lower and center array for providing a stacked beam pattern comprising an upper, lower and center beam said lower and center beams, and said center and upper beams defining a first and a second monopulse boresight axis respectively.
    a variable-frequency, pulsed transmitter coupled to said antenna for transmitting a carrier frequency which is progressively changed from pulse-to-pulse;
    monopulse sum and difference means commonly responsive to said center array and an alternative one of said upper and lower array for providing signals indicative of the range and on-boresight condition respectively of said detected target relative to an alternative one of said boresight axes.

2. Radar means for detecting the time-space occurrence of two points on the trajectory of a detected projectile comprising
    an azimuthally-directional, frequency-scanned antenna comprising an upper, lower and center feed for providing a stacked beam pattern comprising an upper, lower and center beam, said lower and center beams and said center and upper beams defining first and a second monopulse boresight axis, respectively;
    a variable-frequency, pulsed transmitter having an output coupled to said antenna;
    monopulse sum and difference means commonly responsive to said center feed and an alternative one of said upper and lower feed for providing a signal indicative of the range and on-boresight condition respectively of said detected target relative to an alternative one of said boresight axes; and means for programming said frequency of said transmitter to control the azimuth direction of said directive antenna.

3. The device of claim 2 in which said means for programming comprises frequency agility search mode means for providing two like periodic frequency scanning programs, said programs being time-shared, a successive discrete frequency of each program being provided during an alternative one of sequential pulse repetition intervals;

the like periods of said programs being substantially in mutually quadrature time phase relation, whereby the response of the system to second-time-around echoes is reduced.

4. A system for determining a point of origin in a datum plane for a body having a ballistic trajectory, comprising radar means for measuring the time-space occurrence of two mutually spaced points of said ballistic trajectory relative to a reference datum;

second means responsive to said radar means for computing an average height and average vertical velocity represented by a point intermediate said two trajectory points;

third means responsive to said second means for computing the trajectory time from said point of origin to said intermediate point;

fourth means responsive to said radar means for computing the corresponding projected position and velocity component of said intermediate point in said datum plane; and fifth means responsive to said third and fourth means for computing the location of said point of origin in said datum plane.

5. The device of claim 4 in which there is further provided means for correcting the projected position of said point of origin in said datum plane for an elevation difference between said point of origin and said datum plane; and comprising means for selectively biasing said height calculated by said second means.

6. Radar means for detecting the time-space occurrence of two points in the trajectory of a detected projectile comprising an azimuthally-directional, frequency-scanned antenna comprising an upper, lower and center feedhorn for providing a stacked beam pattern comprising an upper, lower and center beam, said lower and center beams and said center and upper beams defining a first and a second monopulse boresight axis respectively;

a variable frequency source of microwave energy;

pulse modulation means responsive to said source of microwave energy and having an output coupled to said antenna;

a microwave hybrid bridge having a first input responsively coupled to the center feedhorn and a second input responsively coupled to an alternative one of said upper and lower feedhorns of said antenna for providing a first and second microwave output indicative respectively of the sum and difference of said inputs;

a first and second microwave mixer, each having a first input commonly responsive to variations in said variable transmitted frequency and a second input responsive to a mutually exclusive one of said outputs of said hybrid bridge for providing a respective intermediate frequency monopulse sum and difference signal; and receiver means responsive to said intermediate frequency signals for providing video output signals indicative of the range and on-boresight condition of a detected target relative to a selected one of said boresight axes.

7. The device of claim 6 in which there is further provided a first duplexer operatively coupling said output of said pulsed modulator and a first input of said microwave bridge to the center feedhorn of said antenna; and a switchable second duplexer having a switching control input operatively coupling said output of said pulsed modulator and a second input of said microwave bridge to a selected one of the upper and lower feedhorns of said antenna in response to switching signals applied to a switching control input of said second duplexer;

programming means for programming said frequency of said transmitter to both cause said directional antenna to scan in azimuth and to provide a switching control signal to said control input of said second duplexer.

8. Radar means for detecting the time-space occurrence of two points in the trajectory of a detected projectile comprising three vertically-stacked, horizontal serpentine microwave radiating arrays in cooperation with a radar reflector for providing a stacked beam pattern having frequency-sensitive, azimuthally directive properties;

a variable frequency pulsed transmitter coupled to said serpentine arrays;

programmer means for varying the frequency of the pulsed transmitter, the output of said programmer being indicative of the azimuth, direction of said directive properties; and monopulse sum and difference receiving means commonly coupled to a center one of said arrays and an alternative one of an upper and lower one of said arrays.

9. The combination comprising:

three mutually parallel serpentine microwave radiative arrays, perpendicularly stacked for providing a stacked antenna beam pattern;

a source of a first and pulsed second selected radio frequency energy having a fixed frequency difference therebetween, corresponding to a preselected intermediate frequency;

a hybrid microwave bridge having a first input responsively connected to a center one of said microwave arrays, a second input and a first and second output indicative of the respective sum of and difference between said inputs;

a first transmit-receive duplexer coupling said source of pulsed energy and said center microwave array, and having a received signal output connected to said first input of said microwave bridge;

a switchable transmit-receive duplexer coupling said source of pulsed energy and an upper and lower one of said microwave arrays and having a received signal output connected to said second input of said microwave bridge, and a switching control terminal adapted to be connected to a two-state source of control signals for operatively connecting the switchable duplexer to a selected one and disconnecting it from the other of said upper and lower arrays;

monopulse intermediate frequency processing means having a first and second input responsive to a respective one of said sum and difference outputs of said microwave bridge; and mixing means interposed between the respective outputs of said monopulse bridge and the corresponding inputs of said intermediate frequency processing means and responsive to said second radio frequency energy of said source for reducing the frequency of the outputs of said microwave bridge to said selected intermediate frequency.

10. The device of claim 9 in which there is further provided
frequency agility search mode means for providing two like periodic frequency scanning programs;
said programs being time-shared, a successive discrete frequency of each program being provided during an alternate one of sequential pulse repetition intervals;
the like periods of said programs being substantially in mutual quadrature time phase relation, whereby the response of the system to second-time-around echoes is reduced.

11. The device of claim 9 is which there is further provided target data processing means responsive to said monopulse processing means for providing a two state switching signal for switching control of said switchable duplexer in response to both a monopulse sum signal amplitude other than null and a concomitant monopulse difference signal null, said response of said target data processor further providing an incremental time delay in said periodic frequency scan program corresponding to a retrograde azimuth bias.

12. The combination comprising:
three mutually parallel serpentine microwave radiative arrays, perpendicularly stacked for providing a stacked antenna beam pattern;
a source of a first and second selected radio frequency energy having a fixed frequency difference therebetween, corresponding to a preselected intermediate frequency;
a pulse modulator interconnection said first radio frequency energy of said source to said microwave arrays;
a hybrid microwave bridge having a first input responsively connected to a center one of said microwave arrays and a second input, and a first and second output indicative of the respective sum of and difference between said inputs;
a first transmit-receive duplexer interposed between said pulse modulator and said center microwave array, and having a transmit signal input coupled to the output of said modulator and a received signal output connected to said first input of said microwave bridge;
a switchable transmit-receive duplexer interposed between said pulse modulator and an upper and lower one of said microwave arrays and having a transmit signal input coupled to the output of the modulator and a received signal output connected to said second input of said microwave bridge, and a switching control terminal adapted to be connected to a source of two-state control signals for operatively connecting the switchable duplexer to a selected one and disconnecting it from the other of said upper and lower arrays;
monopulse intermediate frequency processing means having a first and second input responsive to a respective one of said sum and difference outputs of said microwave bridge; and
mixing means interposed between the respective outputs of said monopulse bridge and the corresponding inputs of said intermediate frequency processing means and responsive to said second radio frequency energy of said source for reducing the frequency of the outputs of said microwave bridge to said selected intermediate frequency.

13. The device of claim 12 in which said first duplexer comprises a ferrite circulator having a first port coupled to said pulse modulator, a second port coupled to said center microwave array, and a third port connected to said first input of said microwave bridge; and in which said switchable duplexer comprises a ferrite circulator having a first port connected to said pulse modulator, a second port connected to one of said upper and lower microwave arrays, a third port connected to said second input of said microwave bridge, a fourth port connected to the other of said upper and lower microwave arrays, and electromagnetic means for changing the effective polarity of the magnetic field provided by a ferrite element of said switchable circulator in response to electrical switching signals applied to said electromagnetic means.

14. The device of claim 12 in which said source of radio frequency energy comprises a plurality of staircase frequency generators for generating a contiguous section of staircase frequencies and signal summing means responsively coupled to said generators, each generator comprising
a first bank of gated oscillators for providing a first preselected number of discrete frequencies spaced apart in the frequency domain by a first preselected frequency difference;
a second bank of gated oscillators for providing a second preselected number of discrete frequencies spaced apart in the frequency domain by a second preselected frequency difference corresponding to the product of said first preselected frequency difference and said first preselected number;
a first mixer responsive to a selected oscillator of each of said first and second banks of oscillators for providing an output having a frequency indicative of the frequency difference between the inputs thereto;
a third bank of gated oscillators for providing a third preselected number of discrete frequencies spaced apart in the frequency domain by a third preselected frequency difference corresponding to the product of said second preselected frequency difference and said second preselected number;
a second mixer responsively coupled to said first mixer and a selected oscillator of said third bank of oscillators for providing an output indicative of the frequency difference between the inputs thereto;
a fourth bank of gated oscillators comprising dual banks of oscillators, each of said dual banks providing a preselected number of discrete frequencies spaced apart in the frequency domain by an amount corresponding to the product of said third preselected frequency difference and said third preselected number, the frequencies of corresponding oscillators of said dual banks of oscillators being spaced apart in the frequency domain by a fixed frequency corresponding to a preselected IF receiver frequency.

15. The device of claim 12 in which said source of radar frequency energy comprises:
a plurality of frequency generators each adapted to generate a successive staircase section of staircase frequencies and operated sequentially, whereby an entire preselected staircase of frequencies is generated;
a signal summing network responsively connected to each of said frequency generators; and
like frequency multiplying means interposed between the output of each said frequency generator and a corresponding input of said signal summing network;
each said frequency generator comprising a
a first staircase frequency generator of like periodicity for providing a preselected staircase frequency function;
a second staircase frequency generator for providing a first periodicity synchronized with and a frequency range corresponding to a single increment of the preselected function provided by said first staircase frequency generator, and
a mixer responsively coupled to the output of said first and second frequency generators for providing a combined staircase function having a periodicity corresponding to that of said first generator and a resolution corresponding to that of said second generator;

each said second staircase generator being comprised of a component first staircase generator for providing said first synchronized periodicity, a component second staircase generator having a second periodicity synchronized with and a frequency range corresponding to a single increment of the function provided by said component first generator, and a component mixer responsive to said component generators for providing said second preselected staircase function, each component first staircase generator being comprised of a coarse frequency staircase generator for providing said second synchronized periodicity, a fine frequency staircase generator having a periodicity synchronized with and a frequency range corresponding to a single increment of the function provided by said coarse frequency generator, a mixer responsive to said coarse and fine frequency staircase generators, and a bandpass filter responsive to said mixer and having a bandwidth corresponding to the maximum and minimum frequency difference between the outputs of said coarse and fine staircase frequency generators, said fine frequency generator being comprised of a preselected number ($n$) of gated oscillators for providing a selected number of discrete frequencies spaced apart in the frequency domain by a first preselected frequency difference $\Delta f$, and said coarse frequency generator being comprised of first a preselected number ($m$) of gated oscillators for providing a selected number of discrete frequencies spaced apart in the frequency domain by a second preselected frequency difference corresponding to the product ($n\Delta f$) of said first preselected frequency difference and said first preselected number.

16. The device of claim 12 in which said source of radio frequency energy comprises a plurality of frequency generators each adapted to generate a successive staircase section of staircase frequencies and operated sequentially, whereby an entire preselected staircase of frequencies is generated;

a signal summing network responsively connected to each of said frequency generators; and like frequency multiplying means interposed between the output of each said frequency generator and a corresponding input of said signal summing network;

each said frequency generator comprising a a coarse staircase frequency generator of like periodicity for providing a preselected staircase frequency function;

a fine staircase frequency generator for providing a first periodicity synchronized with a frequency range and corresponding to a single increment of the preselected function provided by said first staircase frequency generator, and a mixer responsively coupled to the output of said coarse and fine frequency generators for providing a combined staircase function having a periodicity corresponding to that of said coarse generator and a resolution corresponding to that of said fine generator, said fine frequency generator being comprised of a preselected number ($m$) of gated oscillators for providing a selected number of discrete frequencies regularly spaced apart in the frequency domain and representing a preselected frequency bandwidth, and said coarse frequency generator being comprised of dual banks each having a preselected number ($n$) of gated oscillators for providing a selected number of discrete frequencies spaced apart in the frequency domain by a preselected frequency difference corresponding to the preselected frequency bandwidth fine frequency generator.

17. The device of claim 12 in which said source of radio frequency energy includes a chain of oscillator banks comprising a series of combinations of a mixer coupled to a coarse and fine bank of gated oscillators:

each combination of a coarse and fine bank comprising the fine bank of a successive combination of coarse and fine banks;

a first fine bank being comprised of a preselected number of gated oscillators for providing a corresponding number of discrete frequencies spaced apart in the frequency domain by a first preselected frequency difference, the tuning-band of said fine bank being equal to the product of said frequency difference and said number of discrete frequencies;

each coarse bank being comprised of a preselected number of gated oscillators for providing a corresponding number of discrete frequencies spaced apart in the frequency domain by a frequency difference corresponding to the tuning band of an associated fine bank.

18. The device of claim 17 in which the last coarse bank in said chain of oscillator banks is comprised of dual banks of oscillators, the frequencies of corresponding oscillators of said dual banks of oscillators being spaced apart in the frequency domain by a frequency difference corresponding to a preselected IF frequency.

No references cited.

CHESTER L. JUSTUS, *Primary Examiner.*

T. H. TUBBESING, *Assistant Examiner.*